US006548160B2

(12) United States Patent
Naoe et al.

(10) Patent No.: US 6,548,160 B2
(45) Date of Patent: Apr. 15, 2003

(54) MAGNETIC RECORDING MEDIA

(75) Inventors: Koji Naoe, Kanagawa (JP); Kiyomi Ejiri, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 179 days.

(21) Appl. No.: 09/728,308

(22) Filed: Dec. 1, 2000

(65) Prior Publication Data

US 2001/0028963 A1 Oct. 11, 2001

(30) Foreign Application Priority Data

Dec. 1, 1999 (JP) ............................................. 11-342617
Dec. 3, 1999 (JP) ............................................. 11-344641

(51) Int. Cl.$^7$ ............................................. G11B 5/708
(52) U.S. Cl. ................. 428/328; 428/336; 428/694 BU; 428/694 BS
(58) Field of Search ................................. 428/328, 336, 428/694 BN, 694 BS

(56) References Cited

U.S. PATENT DOCUMENTS

| 3,026,215 | A | | 3/1962 | Fukuda et al. |
| 3,031,341 | A | | 4/1962 | Eschenfelder |
| 3,100,194 | A | | 8/1963 | van der Burgt et al. |
| 3,242,005 | A | | 3/1966 | Morita et al. |
| 3,389,014 | A | | 6/1968 | Akashi et al. |
| 4,399,189 | A | * | 8/1983 | Nakashima et al. |
| 4,420,408 | A | * | 12/1983 | Kajimoto et al. |
| 4,420,531 | A | * | 12/1983 | Tokuda |
| 4,656,088 | A | * | 4/1987 | Tokunaga et al. |
| 4,671,993 | A | * | 6/1987 | Kadokura et al. |
| 4,778,714 | A | * | 10/1988 | Woolley et al. |
| 4,797,321 | A | * | 1/1989 | Funahashi et al. |

FOREIGN PATENT DOCUMENTS

| JP | 58-056228 A | 4/1983 |
| JP | 60-238179 A | 11/1985 |
| JP | 60-225827 A | 12/1985 |
| JP | 62-018564 A | 1/1987 |
| JP | 62-95174 A | 5/1987 |
| JP | 62-256219 A | 11/1987 |
| JP | 63-88080 A | 4/1988 |
| JP | 63-187418 A | 8/1988 |
| JP | 63-191315 A | 8/1988 |
| JP | 64-79274 A | 3/1989 |
| JP | 1-106338 A | 4/1989 |
| JP | 1-236969 A | 9/1989 |
| JP | 2-017971 A | 1/1990 |
| JP | 2-174965 A | 6/1990 |
| JP | 2-265672 A | 10/1990 |
| JP | 3-008471 A | 1/1991 |
| JP | 5-182177 A | 7/1993 |
| JP | 5-298653 A | 11/1993 |
| JP | 6-139555 | 5/1994 |
| JP | 7-022224 A | 1/1995 |
| JP | 7-192248 A | 7/1995 |
| JP | 7-296366 A | 11/1995 |
| JP | 7-326038 A | 12/1995 |
| JP | 08-102046 | * 4/1996 |
| JP | 8-165501 A | 6/1996 |
| JP | 8-186015 A | 7/1996 |
| JP | 8-306031 A | 11/1996 |
| JP | 8-306032 A | 11/1996 |
| JP | 9-170003 A | 6/1997 |
| JP | 10-177714 A | 6/1998 |

* cited by examiner

Primary Examiner—Stevan A. Resan
(74) Attorney, Agent, or Firm—Stroock & Stroock & Lavan LLP

(57) ABSTRACT

The present invention aims to provide a magnetic recording medium capable of high-density recording with excellent running durability and preservability as well as a magnetic recording medium capable of high-density recording with low noise even at high output and excellent running durability.

Disclosed are a magnetic recording medium comprises a magnetic layer containing a ferromagnetic powder and a binder provided on a nonmagnetic flexible substrate and a magnetic recording medium comprising a nonmagnetic layer containing a nonmagnetic powder and a binder and a magnetic layer containing a ferromagnetic powder and a binder provided in this order on a nonmagnetic flexible substrate. Provided that said magnetic layer contains a zirconia powder having an average primary particle diameter of 0.005–0.2 $\mu$m, or said magnetic layer has an average thickness in the range of 0.04–0.3 $\mu$m, said ferromagnetic powder is a metal alloy powder having a $\sigma$s of 130 A.m$^2$/kg or more, and said magnetic layer contains a granulated powder having an average primary particle diameter of 0.005–0.2 $\mu$m and a specific gravity of 5 or more.

16 Claims, No Drawings

MAGNETIC RECORDING MEDIA

BACKGROUND OF THE INVENTION

1. Field of the Invention

The present invention relates to magnetic recording media capable of high-density recording with excellent preservability and running durability. The present invention also relates to magnetic recording media capable of high-density recording with low noise at high output and excellent running durability.

2. Description of Related Art

With the recent trend toward higher recording densities, recording wavelengths tend to be shorter to aggravate the problem of self-degaussing loss leading to output loss in thick magnetic layers during recording. Thus, attempts have been made to make magnetic layers thinner, but the surfaces of magnetic layers of 2 $\mu$m or less directly applied on a substrate may be roughened to deteriorate electromagnetic characteristics or to cause dropout under the influence of additives such as abrasives or carbon blacks and aggregated magnetic powders in the magnetic layers as well as the nonmagnetic substrate.

A possible solution to this problem was to apply an underlying nonmagnetic layer and a thin layer of a concentrated magnetic coating liquid thereon by simultaneous multilayer coating (see JP-A Nos. 191315/88 and 187418/88). Such simultaneous multilayer coating allowed good electromagnetic characteristics even in particulate magnetic recording media having a thin magnetic layer. This type of magnetic recording media can assign the nonmagnetic layer underlying the magnetic layer to serve as a reservoir for lubricants to limit the friction coefficient of the magnetic layer even after repeated running, so that running performance can be improved.

In recent consumer digital VCR systems or DDS-4 systems or the like, there are increasing demands for further higher recording densities. In order to satisfy these demands, attempts have been made to further smoothen the surfaces of magnetic layers to improve output by reducing spacing loss or to reduce noise by controlling spacing variation. However, these attempts to smoothen the surfaces of magnetic layers led to another problem of increased magnetic coefficient of the magnetic layers and lowered running durability. Under these circumstances, it has become necessary to provide means for combining high recording densities and running durability at a high level.

It is known that lubricants such as fatty acids can be used to ensure running performance (or lower friction coefficient) in particulate magnetic recording media. Although magnetic recording media are required to have good preservability, such fatty acids used as lubricants may form salts in the presence of impurities derived from raw materials such as powder or manufacturing processes to greatly lower preservability in environments at high temperature and high humidity (see JP-A No. 296366/95).

Thus, it is a first object of this invention to provide a magnetic recording medium capable of high-density recording with excellent running durability and preservability.

In particulate tapes for consumer digital VCR systems or DDS-4 systems, high-$\sigma$s metal alloy powders are used to attain high output. However, metal alloy powders having a high $\sigma$s are highly cohesive so that magnetic particles aggregate in some regions while hollows are formed by additives such as abrasives or carbon blacks in other regions (hollows are formed for lack or scanty of magnetic particles) during application of these powders. This unevenness becomes more apparent if the magnetic layer is thin, e.g. 0.3 $\mu$m or less or if the lower nonmagnetic layer is thin, e.g. 0.8 $\mu$m or less.

The unevenness is further emphasized by calendering, which strongly crushes aggregated magnetic particles while hollows are not crushed. Thus, the surface of the magnetic layer is roughened to increase noise. If the magnetic layer is thin, the packing density of the magnetic layer may be lowered.

Therefore, it is a second object of the present invention to provide a magnetic recording medium capable of high-density recording with low noise even at high output and excellent running durability.

SUMMARY OF THE INVENTION

We carefully studied to achieve the first object. As a result, we accomplished the present invention on the basis of the finding that the first object can be achieved by further adding a zirconia powder into a magnetic layer containing a ferromagnetic powder and a binder provided on a nonmagnetic flexible substrate.

Accordingly, the present invention relates to a magnetic recording medium comprising a magnetic layer containing a ferromagnetic powder and a binder provided on a flexible nonmagnetic substrate or a magnetic recording medium comprising a nonmagnetic layer containing a nonmagnetic powder and a binder and a magnetic layer containing a ferromagnetic powder and a binder provided in this order on a nonmagnetic flexible substrate wherein said magnetic layer further contains a zirconia powder (hereinafter referred to as magnetic recording medium (1)).

Preferred embodiments of magnetic recording medium (1) of the present invention are as follows.

(1) Said zirconia powder preferably has an average primary particle diameter in the range of 0.005–0.2 $\mu$m from the viewpoint that the dispersibility of magnetic solutions during preparation can be improved to reduce surface roughening of the magnetic layer while inhibiting orientational disorder.

(2) Said zirconia powder is preferably at least one member selected from the group consisting of stabilized zirconia, partially stabilized zirconia and zirconia-reinforced ceramics from the viewpoint that the compressive strength of the zirconia powder itself is increased to improve the effect of reinforcing the magnetic layer film and to improve running durability.

(3) Said zirconia powder is preferably prepared by a liquid-phase (wet) process or a gas-phase process from the viewpoint that a finely granulated homogeneous powder with low content of impurities can be formed while improving preservability in environments at high temperature and high humidity.

(4) A nonmagnetic layer is advantageously inserted between said magnetic layer and said substrate to further smoothen the surface of said magnetic layer, thereby improving output and lowering the friction coefficient of said magnetic layer.

(5) Said binder present in said magnetic layer preferably contains a polar group from the viewpoint that adsorption to zirconia powder can be enhanced to reduce separation of zirconia powder during repeated running.

(6) Said magnetic layer preferably contains a fatty acid from the viewpoint that the friction coefficient of said magnetic layer can be lowered.

We carefully studied to achieve the second object. As a result, we accomplished the present invention on the basis of the finding that the second object can be achieved by providing a magnetic recording medium comprising a nonmagnetic layer containing a nonmagnetic powder and a binder and a magnetic layer containing a ferromagnetic powder and a binder provided in this order on a nonmagnetic flexible substrate wherein said magnetic layer has an average thickness in the range of 0.04–0.3 μm, said ferromagnetic powder is a metal alloy powder having a σs of 130 A.m²/kg or more, and said magnetic layer contains a granulated powder having an average primary particle diameter of 0.005–0.2 μm and a specific gravity of 5 or more (hereinafter referred to as magnetic recording medium (2)).

Preferred embodiments of magnetic recording medium (2) of the present invention are as follows.

(1) Said granulated powder is preferably a zirconia powder from the viewpoint that it has a specific gravity close to that of the ferromagnetic powder so that additives-mediated surface roughening can be controlled and the strength as a powder can be readily ensured.

(2) Said granulated powder present in said magnetic layer preferably represents 0.5–10 parts by weight per 100 parts by weight of said metal alloy powder from the viewpoint that the packing density of the magnetic material is ensured while improving dispersibility.

(3) Said binder present in said magnetic layer preferably represents 5–15 parts by weight per 100 parts by weight of said metal alloy powder from the viewpoint that dispersibility is ensured while increasing the packing density of the magnetic material.

(4) Said magnetic layer preferably has an SQ of 0.8 or more from the viewpoint that a high-Br magnetic layer is obtained.

(5) Said magnetic layer has an Hc in the range of 143,280–238,800 A/m (1800–3000 Oe) from the viewpoint that output is improved.

DESCRIPTION OF THE PREFERRED EMBODIMENTS

Magnetic recording medium (1)

Magnetic recording medium (1) of the present invention is characterized in that the magnetic layer contains a zirconia powder. The zirconia powder used in magnetic recording medium (1) of the present invention preferably has an average primary particle diameter in the range of 0.005–0.2 μm, and said zirconia powder is preferably at least one member selected from the group consisting of stabilized zirconia, partially stabilized zirconia and zirconia-reinforced ceramics. The zirconia powder can be prepared by a liquid-phase (wet) process or a gas-phase process and preferably has a purity of 99% or more.

Now, zirconia powders are described in detail.

Preparation processes and characteristics of zirconia powders are described in Miyajima, N.: "New Ceramics", 1st ed., Chijin Shokan, Sep. 4, 1994; Moriyoshi, Y. et al.: "Sintering of Ceramics", 1st ed., Uchida Rohkakuho, Dec. 15, 1995; and "NEW KERAS SERIES 8, Ceramic fine powder technology", 1st ed., Gakkensha, Feb. 14, 1994. As compared with solid-phase processes, liquid-phase (wet) and gas-phase processes can prepare finely granulated powders having a high purity of 99% or more. The advantages of adding a zirconia powder into the magnetic layer are explained below.

(1) Zirconia powders have high strength, high tenacity and abrasion-resistant characteristics so that they can be used as reinforcing agents for magnetic layers to improve durability during repeated running. Especially effective zirconia powders are stabilized zirconia (FSZ) of $Y_2O_3$—$ZrO_2$, $CaO$—$ZrO_2$ and $MgO$—$ZrO_2$ types; partially stabilized zirconia (PSZ) obtained by precipitating fine tetragonal crystals in cubic crystals of zirconia to mix both crystals; and zirconia-reinforced ceramics (ZTC) obtained by dispersing tetragonal zirconia in alumina or silicon nitride or the like.

(2) Abrasives such as alumina or chromium oxide have conventionally served as reinforcing agents for magnetic layers. Zirconia powders have a lower abrasive power than those of the conventional reinforcing agents so that the content of abrasives can be decreased to provide a magnetic recording medium with reduced head abrasion and excellent running durability.

(3) Finely granulated zirconia powders (especially having an average primary particle diameter of 0.1 μm or less and an $S_{BET}$ of 7 m²/g or more) have catalytic functions such as high activation. Stabilized zirconia (FSZ) of $Y_2O_3$—$ZrO_2$, $CaO$—$ZrO_2$ and $MgO$—$ZrO_2$ types has the advantage that it can improve durability during repeated running by increasing the proportions of stabilizers to promote adsorption of binders to the surfaces of magnetic powders or to permit adsorption of binders to the surfaces of zirconia powders because of its oxygen ionic conductivity. Another characteristic of zirconia powders is that they serve to lower friction coefficient without forming high projections on the surfaces of magnetic layers. Such an effect may be attributed to the adsorption of fatty acids to the surfaces of zirconia powders or the water repellency inherent to zirconia powders.

(4) Carbon blacks have been typically used as solid lubricants in conventional magnetic recording media. However, the friction coefficient-lowering effect is remarkably lessened with carbon blacks having an average primary particle diameter of 0.05 μm or less. Carbon blacks may form high projections of 20 nm or more among others on the surfaces of magnetic layers to invite output loss because of their low specific gravity. Therefore, it was difficult to improve output and lower friction coefficient at the same time. In contrast, zirconia powders are ceramics that are effective in lowering friction coefficient even at an average primary particle diameter of 0.05 μm or less and serve for carbon blacks or abrasives. They have a specific gravity of about 6 g/cm³, which is higher than that of alumina or chromium oxide, for example, so that they can suppress the formation of high projections on the surfaces of magnetic layers. Thus, a magnetic recording medium with high output and low friction coefficient can be prepared by adjusting the average primary particle diameter and loading amount of zirconia and the thicknesses of magnetic layers.

(5) Recently, magnetic solutions for magnetic recording media (including solutions for lower nonmagnetic layers if they are provided) are sometimes prepared by using zirconia beads having a particle diameter of 0.1 to a few mm as dispersion media for ensuring high dispersion and reducing abrasion of the beads. According to the present invention, high dispersion of magnetic powders can be further promoted and aggregation can be suppressed by preliminarily adding a zirconia powder to be added to magnetic layers, such as a zirconia powder having an average primary particle diameter of 0.01–0.2 μm, during dispersion. Especially when a ferromagnetic metal powder having a as of 120 A.m²/kg or more or barium/ferrite powder liable to stacking is used as a ferromagnetic powder, the coexistence of the zirconia powder in magnetic solutions during dispersion using zirconia beads is effective in high dispersion and anti-aggregation. The coexistence of the zirconia powder in magnetic solutions during dispersion using zirconia beads also has the advantage that abrasion of the zirconia beads can be reduced as compared with magnetic solutions containing abrasives such as alumina.

In magnetic recording medium (1) of the present invention, the benefit of the invention can be further improved by combining the following characteristics.

The zirconia powder added to the magnetic layer suitably has an average primary particle diameter in the range of 0.005–0.2 $\mu$m, preferably 0.01–0.1 $\mu$m, more preferably 0.01–0.05 $\mu$m. The average primary particle diameter of the zirconia powder can be appropriately selected taking into account the fact that projections may be readily formed on the surface of the magnetic layer if the average primary particle diameter of the zirconia powder is too large while the friction coefficient-lowering effect tends to be lessened if the average primary particle diameter of the zirconia powder is too small. Zirconia powders having a particle diameter smaller than 0.18 $\mu$m, i.e. the minimum average primary particle diameter of alumina conventionally used as a typical abrasive, can be obtained by appropriately selecting the preparation process and conditions therefor as described later. This means that the problem of projections on the surfaces of magnetic layers can be overcome to provide a magnetic recording medium having a higher recording density.

The zirconia powder used in magnetic recording medium (1) of the present invention preferably has a high purity of 99% or more from the viewpoint that the formation of fatty acid salts during storage at high temperature and high humidity is restrained. The purity here means the purity of zirconia in the case of simple zirconia systems; or the purity of zirconia plus stabilizers such as $Y_2O_3$, CaO or MgO in the case of stabilized zirconia (FSZ) of $Y_2O_3$—$ZrO_2$, CaO—$ZrO_2$ and MgO—$ZrO_2$ types or partially stabilized zirconia (PSZ); or the purity of zirconia plus stabilizers such as $Y_2O_3$ plus reinforcing agents such as $Al_2O_3$ in the case of zirconia-reinforced ceramics (ZTC) obtained by dispersing tetragonal zirconia in alumina or silicon nitride or the like.

The specific surface areas ($S_{BET}$) of zirconia powders are basically inversely proportional to the particle diameters of the zirconia powders. Thus, the specific surface area of the zirconia powder of the present invention having a particle diameter of 0.005–0.2 $\mu$m is in the range of 4–200 $m^2/g$, preferably 10–100 $m^2/g$ for serving catalytic functions, more preferably 20–100 $m^2/g$.

The particle diameter, purity and specific surface area of the zirconia powder can be varied by appropriately selecting the preparation process and process conditions.

The preparation process of the zirconia powder is preferably a liquid-phase or gas-phase process from the viewpoint that finely granulated high-purity powders can be prepared, or it is preferably a liquid-phase process in respect of mass productivity. Typical liquid-phase processes include neutralization coprecipitation, hydrolysis, alkoxidation or the like, among which hydrolysis and alkoxidation are preferred to form a finely granulated zirconia powder. In any process, the calcination temperature greatly influences the average primary particle diameter and should preferably be 900° C. or less to prepare fine particles.

Among liquid-phase processes, hydrothermal synthesis is preferred as a process for preparing the zirconia powder used in the present invention because it has the advantages that calcination is not always needed, finely granulated powder comparable to those obtained by alkoxidation can be prepared and spherical particle shape can be obtained.

The amount of the zirconia powder to be added to the magnetic layer is suitably in the range of 0.05–20 parts by weight, preferably 0.1–10 parts by weight, more preferably 0.5–5 parts by weight per 100 parts by weight of the ferromagnetic powder because too small amounts compromise the friction coefficient-lowering effect while too large amounts decrease the packing density of the magnetic layer to invite output loss.

In the magnetic layer of the present invention, solid lubricants such as carbon blacks or abrasives such as alumina are also preferably used to further improve running durability. However, the amount of solid lubricants or abrasives is preferably smaller than those used in conventional magnetic recording media in order to smoothen the surface of the magnetic layer, i.e. improve electromagnetic characteristics (improve output and reduce noise). This is because the magnetic layer of the present invention contains a zirconia powder.

Carbon blacks in the magnetic layer preferably have an average primary particle diameter of 0.05–0.1 $\mu$m and suitably represent 0.05–2 parts by weight, preferably 0.05–1 parts by weight, more preferably 0.05–0.6 parts by weight per 100 parts by weight of the ferromagnetic powder. Abrasives that may be added to the magnetic layer are preferably powders having a Mohs hardness of 9 or more and a Vickers hardness of 1000 (kgf/mm$^2$) or more such as alumina, chromium oxide, boron nitride (CBN), $Si_3N_4$, SiC or diamond powder. If used, abrasives preferably have an average primary particle diameter greater than that of the zirconia powder in order to ensure abrasive power (head cleaning power). Abrasives suitably have a particle diameter of 0.1–0.5 $\mu$m, preferably 0.15–0.3 $\mu$m in order to ensure abrasive power.

The amount of abrasives to be added is suitably in the range of 0.5–10 parts by weight, preferably 0.5–5 parts by weight, more preferably 0.5–2.5 parts by weight per 100 parts by weight of the ferromagnetic powder. When a single magnetic layer having a thickness of 1 $\mu$m or less is directly formed on a substrate (without forming a lower nonmagnetic), 2.5 parts by weight or less of abrasives are preferably used to prepare a magnetic recording medium having a magnetic layer with good surface properties as well as high C/N and excellent running durability. The surface-smoothening effect on the magnetic layer or C/N-improving effect in the case of a single magnetic layer is further promoted by using a smooth substrate (having 100 or less surface projections of 20 nm or more per 30 $\mu$m×30 $\mu$m square measured with an AFM and a PSD (Power Spectral Density) of 0.2 nm$^2$ or less at a wavelength of 1–5 $\mu$m).

The Vickers hardness of zirconia powders is 750–1600 (Kgf/mm$^2$), and typical zirconia powders such as simple systems or $Y_2O_3$—$ZrO_2$ systems have a hardness of about 1300 (Kgf/mm$^2$). When a zirconia powder of MgO—$ZrO_2$ type having a low Vickers hardness and a low specific gravity is used, it is preferably adapted to improve running durability by increasing the particle diameter of abrasives or the amount of abrasives as compared with other zirconia powders.

Magnetic recording medium (1) of the present invention includes not only the embodiment in which a single magnetic layer is directly provided on a substrate but also the embodiment in which the single magnetic layer is replaced by a multilayer magnetic structure or a nonmagnetic layer is inserted between the magnetic layer and the substrate. In the former embodiment, the zirconia powder is added to at least the uppermost magnetic layer.

The thickness of the single magnetic layer is suitably in the range of 0.1–3 $\mu$m, preferably 0.1–1.5 $\mu$m, more preferably 0.1–1 $\mu$m.

In the case of the multilayer magnetic structure, the zirconia powder is preferably present only in the uppermost magnetic layer to improve the packing density of magnetic layers, but may also be present in other layers than the uppermost layer to prevent edge damages during repeated running. The thickness of the uppermost layer of the multilayer magnetic structure is suitably in the range of 0.02–0.5 $\mu$m, preferably 0.04–0.3 $\mu$m. The total thickness of magnetic layers is suitably in the range of 0.04–3 $\mu$m, preferably 0.04–1.8 $\mu$m, more preferably 0.04–1 $\mu$m.

When a nonmagnetic layer is formed between the magnetic layer and the substrate, the thickness of the magnetic layer is suitably in the range of 0.02–0.3 $\mu$m, preferably 0.04–0.2 $\mu$m. The thickness of the nonmagnetic layer is suitably in the range of 0.1–3$\mu$, preferably 0.4–2 $\mu$m, more preferably 0.4–1 $\mu$m.

When the magnetic layer and the nonmagnetic layer are formed by simultaneous multilayer coating, the zirconia powder or abrasive particles added to the upper magnetic layer may sink into the lower nonmagnetic layer if the nonmagnetic layer is thick. If the lower nonmagnetic layer is thick, calendering moldability is enhanced and the zirconia powder or abrasive particles are further forced into the lower nonmagnetic layer. Therefore, it is preferable to increase the particle diameter of the zirconia powder or abrasive particles to ensure running durability. If the thickness of the nonmagnetic layer is 1 $\mu$m or less, the penetration of particles into the lower nonmagnetic layer is lessened. Therefore, it is preferable to use a zirconia powder having a small particle diameter. Similarly to the single magnetic layer structure described above, the amount of abrasives is suitably in the range of 0.5–2.5 parts by weight per 100 parts by weight of the ferromagnetic powder when the nonmagnetic layer has a thickness of 1 $\mu$m or less from the viewpoint that surface roughening of the magnetic layer caused by abrasives or carbon blacks in the magnetic layer is suppressed.

If used, the amount of carbon blacks is preferably in the range of 0.05–0.6 parts by weight. If carbon blacks are used, the average primary diameter of the zirconia powder used in combination is preferably 0.1 $\mu$m or less.

In the structure having a nonmagnetic layer and two or more magnetic layers, it is preferable to add a zirconia powder only to the uppermost magnetic layer to improve the packing density of magnetic layers and running durability. However, the zirconia powder may also be added to other magnetic layers than the uppermost layer if dispersibility is insufficient in those layers.

In the present invention, a finely granulated zirconia powder having a controlled particle diameter is added to magnetic layers and a filter having an absolute filtration fineness of 5 $\mu$m is used during the preparation of solutions, so that any fractions of zirconia beads (0.1 to a few mm $\phi$)) used as dispersion media during the preparation of solutions cannot be actually included in the magnetic layers.

Magnetic recording medium (2)

As a result of careful studies, we found the following. If a metal alloy powder having a $\sigma$s of 130 A.m$^2$/kg or more is used and the amount of binders in magnetic layers is limited to 15 parts by weight or less per 100 parts by weight of the metal alloy powder to increase the packing density of the metal alloy powder in the magnetic layers, the metal alloy powder (magnetic particles) aggregates in some regions while hollows are locally formed in the vicinity of additives such as abrasives or carbon blacks when the thickness of the magnetic layers is a 0.3 $\mu$m or less. We found that surface roughening of the magnetic layers caused by these locally distributed hollows is significantly responsible for noise. Such surface roughening can be somewhat lessened by weakening orientation. However, a magnetic recording medium with high output and high C/N was difficult to prepare because Br loss and inherent surface roughening of magnetic layers caused output loss.

We found that these hollows are formed because abrasives or carbon black particles stop movement in advance of magnetic particles during coating and drying processes while the mobile magnetic particles generate vortex flow to form hollow spaces containing no or few magnetic particles on the side coated with abrasives or carbon black particles. Thus, we achieved magnetic recording medium (2) of the present invention on the basis of the finding that the formation of (stripe-like) hollows in the vicinity of additives such as abrasives or carbon blacks can be suppressed by using finely granulated additives having a specific gravity close to that of the metal alloy powder (magnetic particles). Namely, magnetic recording medium (2) of the present invention can suppress the above-described surface roughening by using ceramic particles having a slightly different specific gravity from those of magnetic particles such as zirconia powder (specific gravity 5.4–6.1) as additives to magnetic layers.

We also found that surface roughening is further suppressed if particles having a particle diameter three times or less the minor axis length of magnetic particles are used as granulated powder. In this case, magnetic recording medium (2) with less surface roughening can be obtained even when a magnetic material having a high-$\sigma$s is used to enhance orientation.

Generally, high output of magnetic recording media can be achieved by reducing the thickness of magnetic layers or increasing Hc or Br. In magnetic recording medium (2) of the present invention, high output is obtained by dispersing a high-$\sigma$s magnetic material in a binder in a small amount ensuring dispersibility to form a magnetic layer with improved calendering moldability and high Bm. Alternatively, output can be improved by using a high-Hc magnetic material and selecting an urethane resin having a polar group as a main binder to improve Hc or Br of the magnetic layer. According to the present invention, magnetic recording medium (2) with low noise (high C/N ratio) can be provided by limiting the amount of additives having a greatly different specific gravity from those of magnetic particles and using a finely granulated powder having a high specific gravity in the magnetic layer designed for high output described above.

Suitable granulated powders having a specific gravity of 5 or more for use in magnetic recording medium (2) of the present invention include, for example, $ZrO_2$ powder, $CeO_2$ powder, $SnO_2$ powder, ZnO powder and ITO ($Sn/In_2O_3$) powder. Especially, $ZrO_2$ powder is most preferred because it is excellent for conferring running durability. However, $ZrO_2$ powder is not limitative. Zirconia powders preferred in respect of running durability include stabilized zirconia (FSZ) of $Y_2O_3$—$ZrO_2$, CaO—$ZrO_2$ and MgO—$ZrO_2$ types; partially stabilized zirconia (PSZ) obtained by precipitating fine tetragonal crystals in cubic crystals of zirconia to mix both crystals; and zirconia-reinforced ceramics (ZTC) obtained by dispersing tetragonal zirconia in alumina or silicon nitride or the like.

Characteristics of powders such as specific gravity are described in Miyajima, N.: "New Ceramics", 1st ed., Chijin Shokan, Sep. 4, 1994; Moriyoshi, Y. et al.: "Sintering of Ceramics", 1st ed., Uchida Rohkakuho, Dec. 15, 1995; and "NEW KERAS SERIES 8, Ceramic fine powder technology", 1st ed., Gakkensha, Feb. 14, 1994.

Examples of the zirconia powder used as a granulated powder in magnetic recording medium (2) of the present invention include HZN and HZY3M manufactured by Hokko Chemical Industry Co., Ltd.; TZ-0, TZ-3TYZ-3YS, TZ-3Y20A, TZ-8Y and TZ-8YS manufactured by TOSOH CORPORATION; SUR, SA, EP, SPZ, RC-100, AGC-M, HSY-2.6, HSY-3.0, HSY-3.0-15, HSY-3.0B, HSY-8, CEZ-10, MSZ-8 and ATZ-40 manufactured by Daiichi Kigenso Kagaku Kogyo Co., Ltd., etc.

The advantages of adding a zirconia powder as a granulated powder into the magnetic layer are explained below.

(1) Zirconia powders have high strength, high tenacity and abrasion-resistant characteristics so that they can be used as reinforcing agents for magnetic layers to improve durability during repeated running. Especially effective zirconia powders are stabilized zirconia (FSZ) of $Y_2O_3$—$ZrO_2$, CaO—$ZrO_2$ and MgO—$ZrO_2$ types; partially stabilized zirconia (PSZ) obtained by precipitating fine tetragonal crystals in cubic crystals of zirconia to mix both crystals; and zirconia-reinforced ceramics (ZTC) obtained by dispersing tetragonal zirconia in alumina or silicon nitride or the like.

(2) Abrasives such as alumina or chromium oxide have conventionally served as reinforcing agents for magnetic layers. Zirconia powders have a lower abrasive power than those of the conventional reinforcing agents so that the content of abrasives can be decreased to provide a magnetic recording medium with reduced head abrasion and excellent running durability.

(3) Finely granulated zirconia powders (especially having an average primary particle diameter of 0.1 µm or less and an $S_{BET}$ of 7 $m^2$/g or more) have catalytic functions such as high activation. Stabilized zirconia (FSZ) of $Y_2O_3$—$ZrO_2$, CaO—$ZrO_2$ and MgO—$ZrO_2$ types has the advantage that it can improve durability during repeated running by increasing the proportions of stabilizers to promote adsorption of binders to the surfaces of magnetic powders or to permit adsorption of binders to the surfaces of zirconia powders because of its oxygen ionic conductivity. Moreover, zirconia powders serve to lower friction coefficient without forming high projections on the surfaces of magnetic layers. The lowered friction coefficient may be attributed to the adsorption of fatty acids to the surfaces of zirconia powders or the water repellency inherent to zirconia powders.

(4) Carbon blacks have been typically used as solid lubricants in conventional magnetic recording media. However, the friction coefficient-lowering effect is remarkably lessened with carbon blacks having an average primary particle diameter of 0.05 µm or less. Carbon blacks may form high projections of 20 nm or more among others on the surfaces of magnetic layers to invite output loss because of their low specific gravity. Therefore, it was difficult to improve output and lower friction coefficient at the same time. In contrast, zirconia powders are ceramics that are effective in lowering friction coefficient even at an average primary particle diameter of 0.05 µm or less and serve for carbon blacks or abrasives. They have a specific gravity of about 6 g/$cm^3$, which is higher than that of alumina or chromium oxide, for example, so that they can suppress the formation of high projections on the surfaces of magnetic layers. Thus, a magnetic recording medium with high output and low friction coefficient can be obtained by adjusting the average primary particle diameter and loading amount of zirconia and the thicknesses of magnetic layers.

(5) Recently, magnetic solutions for magnetic recording media (including solutions for lower nonmagnetic layers if they are provided) are sometimes prepared by using zirconia beads having a particle diameter of 0.1 to a few mm as dispersion media for ensuring high dispersion and reducing abrasion of the beads. According to the present invention, high dispersion of magnetic powders can be further promoted and aggregation can be suppressed by preliminarily adding a zirconia powder having an average primary particle diameter of 0.01–0.2 µm during dispersion. The coexistence of the zirconia powder in magnetic solutions during dispersion using zirconia beads also has the advantage that abrasion of the zirconia beads can be reduced as compared with magnetic solutions containing abrasives such as alumina.

Magnetic recording medium (2) of the present invention is further explained below.

The granulated powder such as zirconia powder added to the magnetic layer of magnetic recording medium (2) suitably has an average primary particle diameter in the rage of 0.005–0.2 µm, preferably 0.01–0.1 µm, more preferably 0.01–0.05 µm. The average primary particle diameter of the granulated powder such as zirconia powder can be appropriately selected taking into account the fact that projections may be readily formed on the surface of the magnetic layer if the average primary particle diameter of the granulated powder such as zirconia powder is too large while the friction coefficient-lowering effect tends to be lessened if the average primary particle diameter of the granulated powder such as zirconia powder is too small.

The specific surface area ($S_{BET}$) of the granulated powder such as zirconia powder varies with the nature of the granulated powder. For example, the specific areas of zirconia powders are basically inversely proportional to the particle diameters of the zirconia powders. Thus, the specific surface area of the zirconia powder of the present invention having a particle diameter of 0.005–0.2 µm is in the range of 4–200 $m^2$/g, preferably 10–100 $m^2$/g for serving catalytic functions, more preferably 20–100 $m^2$/g.

When the granulated powder is a zirconia powder, its particle diameter and specific surface area can be varied by appropriately selecting the preparation process and process conditions.

The preparation process of the zirconia powder is preferably a liquid-phase or gas-phase process from the viewpoint that finely granulated powder can be prepared, or it is preferably a liquid-phase process in respect of mass productivity. Typical liquid-phase processes include neutralization coprecipitation, hydrolysis, alkoxidation or the like, among which hydrolysis and alkoxidation are preferred to form a finely granulated zirconia powder. In any process, the calcination temperature greatly influences the average primary particle diameter and should preferably be 900° C. or less to prepare fine particles.

Among liquid-phase processes, hydrothermal synthesis is preferred as a process for preparing the zirconia powder used in magnetic recording medium (2) of the present invention because it has the advantages that calcination is not always needed, finely granulated powder comparable to those obtained by alkoxidation can be prepared and spherical particle shape can be obtained.

The amount of the granulated powder such as zirconia powder to be added to the magnetic layer of magnetic recording medium (2) is suitably in the range of 0.5–10 parts by weight, preferably 0.5–5 parts by weight per 100 parts by weight of the ferromagnetic metal alloy powder. As the average primary particle diameter decreases, the surface roughening-reducing effect mediated by magnetic particles increases. Desired surface roughening-reducing effect and friction coefficient-lowering effect are obtained so far as the amount is 0.5 parts by weight or more. Sufficient output is attained without any loss of the packing density of the magnetic layer so far as the amount is 10 parts by weight or less.

In the magnetic layer of magnetic recording medium (2) of the present invention, solid lubricants such as carbon blacks or abrasives such as alumina are also preferably used to further improve running durability. However, the amount of solid lubricants or abrasives is preferably smaller than those used in conventional magnetic recording media in order to smoothen the surface of the magnetic layer, i.e. improve electromagnetic characteristics (improve output and reduce noise).

Carbon blacks in the magnetic layer preferably have an average primary particle diameter of 0.05–0.1 μm and suitably represent 0.05–2 parts by weight, preferably 0.05–1 parts by weight, more preferably 0.05–0.8 parts by weight per 100 parts by weight of the ferromagnetic powder. Abrasives that may be added to the magnetic layer are preferably powders having a Mohs hardness of 9 or more and a Vickers hardness of 1000 (kgf/mm$^2$) or more such as alumina, chromium oxide, boron nitride (CBN), $Si_3N_4$, SiC or diamond powder. If used, abrasives preferably have an average primary particle diameter larger than that of the granulated powder such as zirconia powder in order to ensure abrasive power (head cleaning power). Abrasives suitably have a particle diameter of 0.15–0.4 μm, preferably 0.18–0.35 μm in order to ensure abrasive power.

When the magnetic layer has a thickness in the range of 0.04–0.3 μm, the amount of abrasives to be added is suitably in the range of 0.5–10 parts by weight, preferably 0.5–5 parts by weight, more preferably 0.5–2.5 parts by weight per 100 parts by weight of the ferromagnetic powder.

The Vickers hardness of zirconia powders is 750–1600 (Kgf/mm$^2$), and typical zirconia powders such as simple systems or $Y_2O_3$—$ZrO_2$ systems have a hardness of about 1300 (Kgf/mm$^2$). When a zirconia powder of MgO—$ZrO_2$ type having a low Vickers hardness and a low specific gravity is used, it is preferably adapted to improve running durability by increasing the particle diameter of abrasives or the amount of abrasives as compared with other zirconia powders.

The average particle diameter k of abrasives and the thickness h of the lower nonmagnetic layer are suitably chosen in such a manner that the h/k ratio is in the range of 2–15, preferably 5–10. This is because penetration of abrasives can be controlled while ensuring calendering moldability, whereby a magnetic recording medium having a magnetic layer with good surface properties as well as high C/N ratio and excellent running durability can be prepared.

The surface-smoothening effect on the magnetic layer or C/N-improving effect in the case of a single magnetic layer is further promoted by using a smooth substrate (having 100 or less surface projections of 20 nm or more per 30 μm×30 μm square measured with an AFM and a PSD (Power Spectral Density) of 0.2 nm$^2$ or less at a wavelength of 1–5 μm).

The thickness of the magnetic layer is suitably in the range of 0.04–0.3 μm, preferably 0.04–0.12 μm. The thickness of the magnetic layer in the range of 0.04–0.3 μm has the advantage that projection of additives such as abrasives or carbon blacks or a granulated powder having a specific gravity of 5 or more into the surface of the magnetic layer can be readily controlled. If the thickness of the magnetic layer is less than 0.04 μm, additives tend to project so that they may be separated. If the thickness of the magnetic layer exceeds 0.3 μm, additives tend to sink so that the height of additives projecting into the surface of the magnetic layer is lowered to compromise the benefit of improved durability. The thickness of the nonmagnetic layer is suitably in the range of 0.1–3 μm, preferably 0.4–2 μm, more preferably 0.4–1.5 μm. The small thickness of the lower layer can help additives in the magnetic layer to project into the surface of the magnetic layer. If the thickness of the lower layer exceeds 3 μm, the height of additives projecting into the surface of the magnetic layer is decreased, whereby durability is deteriorated.

When the magnetic layer and the nonmagnetic layer are formed by simultaneous multilayer coating, the granulated powder such as zirconia powder or abrasive particles added to the upper magnetic layer may sink into the lower nonmagnetic layer if the nonmagnetic layer is thick. If the lower nonmagnetic layer is thick, calendering moldability is enhanced and the granulated powder such as zirconia powder or abrasive particles are further forced into the lower nonmagnetic layer. Therefore, it is preferable to increase the particle diameter of the granulated powder such as zirconia powder or abrasive particles to ensure running durability. If the thickness of the nonmagnetic layer is 1 μm or less, the penetration of particles into the lower nonmagnetic layer is lessened. Therefore, it is preferable to use a granulated powder such as a zirconia powder having a small particle diameter. Similarly to the single magnetic layer structure described above, the amount of abrasives is suitably in the range of 0.5–2.5 parts by weight per 100 parts by weight of the ferromagnetic powder when the nonmagnetic layer has a thickness of 1 μm or less from the viewpoint that surface roughening of the magnetic layer caused by abrasives or carbon blacks in the magnetic layer is suppressed.

The amount of carbon blacks is preferably in the range of 0.05–0.6 parts by weight. In this case, the average primary diameter of the zirconia powder is preferably 0.1 μm or less.

In the structure having a nonmagnetic layer and two or more magnetic layers, it is preferable to add a zirconia powder only to the uppermost magnetic layer to improve the packing density of magnetic layers and running durability. However, the zirconia powder may also be added to other magnetic layers than the uppermost layer if dispersibility is insufficient in those layers.

In magnetic recording medium (2) of the present invention, a granulated powder such as a finely granulated zirconia powder having a controlled particle diameter is added to magnetic layers, so that any fractions of zirconia beads (0.1 to a few mm φ) used as dispersion media during the preparation of solutions cannot be basically included when the granulated powder is a zirconia powder.

Magnetic layers of magnetic recording media (1) and (2) of the present invention are explained more in detail below.

Magnetic recording medium (1)

Magnetic recording medium (1) of the present invention may include both embodiments of a single magnetic layer and a multiple (multilayer) magnetic layer. In the latter case, techniques as described in JP-A No. 139555/94 can be applied.

In magnetic recording medium (1) of the present invention, magnetic layers ideally show no variation in thickness because the relatively small thicknesses of the magnetic layers lead to a saturated recording state. However, thickness variation is practically acceptable so far as the relationship between the thicknesses of magnetic layers d and the standard deviation σ of the thicknesses of magnetic layers satisfies σ/d≦0.5, more preferably σ/d≦0.3. Specifically, σ can be reduced by using a thixotropic nonmagnetic coating liquid for lower layers or using an acicular nonmagnetic powder for lower layers or applying the weton-dry process comprising applying and drying a lower nonmagnetic layer and thereafter applying upper magnetic layers, as described in Japanese Patent No. 2566096. The residual magnetization of magnetic layers is suitably in the range of 0.63–6.3 μT (0.0005–0.005 emu/cm$^2$). This residual magnetization is optimized depending on the recording/reproducing mode. The residual magnetization can be adjusted to the value shown above by various means. If this medium is used for reproducing with an inductive head, for example, a relatively high value is chosen within the range of residual magnetization shown above. When magnetic layers are designed to have a relatively small thickness (for example, 0.1 μm or less) to satisfy O/W demands, it is preferable to use an alloy powder having a high σs (140–160 emu) as a magnetic powder.

If the medium is used for reproduction with an MR head, however, it is preferable to increase the number of particles and choose a relatively small residual magnetization within the range shown above. In this case, the packing density is suitably improved to the utmost by using a magnetic powder having a σs of 50–130 emu/g and reducing the amount of binders in upper/lower layers.

Suitable magnetic powders for use in the present invention include, for example, alloy powders having a σs of 100–130 emu/g, hexagonal ferrites having a σs of 50–80 emu/g, magnetites and Co-ferrites.

In addition to specified atoms, magnetic powders may contain other atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B. To improve thermal stability, such atoms as Al, Si, Ta or Y may be deposited or dissolved in solid on the surfaces. Particularly for obtaining high Hc, it is well known that Co, Sm, Nd or the like is added at 5–40% by weight on the basis of Fe.

Magnetic recording medium (2)

Magnetic recording medium (2) of the present invention may include both embodiments of a single magnetic layer and a multiple (multilayer) magnetic layer. In the latter case, techniques as described in JP-A No. 139555/94 can be applied.

In magnetic recording medium (2) of the present invention, magnetic layers ideally show no variation in thickness because the relatively small thicknesses of the magnetic layers lead to a saturated recording state. However, thickness variation is practically acceptable so far as the relationship between the thicknesses of magnetic layers d and the standard deviation σ of the thicknesses of magnetic layers satisfies σ/d≦0.5, more preferably σ/d≦0.3. Specifically, σ can be reduced by using a thixotropic nonmagnetic coating liquid for lower layers or using an acicular nonmagnetic powder for lower layers or applying the wet-on-dry process comprising applying and drying a lower nonmagnetic layer and thereafter applying upper magnetic layers, as described in Japanese Patent No. 2566096. The residual magnetization of magnetic layers is suitably in the range of 0.63–6.3 μT (0.0005–0.005 emu/cm$^2$). This residual magnetization is optimized depending on the recording/reproducing mode. The residual magnetization can be adjusted to the value shown above by various means. If this medium is used for reproducing with an inductive head, for example, a relatively high value is chosen within the range of residual magnetization shown above. When magnetic layers are designed to have a relatively small thickness (for example, 0.1 μm or less) to satisfy O/W demands, it is preferable to use an alloy powder having a high σs (140–160 emu) as a magnetic powder.

Ferromagnetic powders used in magnetic recording medium (2) of the present invention are metal alloy powders having a σs of 130 A.m$^2$/kg or more. Such ferromagnetic powders include, for example, Fe—Co alloy powders, Fe—Co—Ni alloy powders, etc.

Said alloy powders may further contain such atoms as Al, Mg, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Mn, Zn, Sr and B. Especially preferred powders contain at least one of Al, Mg, Si, Ca, Y, Ba, La, Nd and B.

It is a matter of course that the particle sizes of magnetic materials should be reduced within the range free from the influence of thermal asperity irrespective of the type of the reproducing head.

Practically, the current state-of-the-art has attained an average major axis length of 0.05–0.2 μm and an average minor axis length of 0.01–0.025 μm for acicular particles. Such ferromagnetic powders and preparation processes thereof are described in JP-A Nos. 22224/95, 165501/96, 186015/96, 306031/96, for example. Preferred ranges are not limited to the state-of-the-art ranges shown above, but smaller particle sizes may be used if technological development permits.

These magnetic powders may be preliminarily treated with dispersants, lubricants, surfactants, antistatic agents or the like before they are dispersed.

Magnetic layers preferably have an SQ of 0.8 or more to obtain high-Br magnetic layers. More preferably, magnetic layers have an SQ of 0.85 or more.

Magnetic layers have a coercive force Hc of 143, 280–238,800 A/m (1800–3000 Oe), preferably 159, 200–238,800 A/m (2000–3000 Oe), more preferably 175, 120–238,800 A/m (2200–3000 Oe), and hence, the magnetic powders described above preferably have a similar Hc.

Ferromagnetic metal powders used in magnetic layers of magnetic recording media (1) and (2) described above may be treated with dispersants, lubricants, surfactants, antistatic agents or the like described later before they are dispersed, specifically as described in JP-B Nos. 14090/69, 18372/70, 22062/72, 22513/72, 28466/71, 38755/71, 4286/72, 12422/72, 17284/72, 18509/72, 18573/72, 10307/64 and 39639/73 and U.S. Pat. Nos. 3,026,215, 3,031,341, 3,100,194, 3,242,005 and 3,389,014.

Ferromagnetic metal powders may contain a small amount of a hydroxide or oxide. Suitable ferromagnetic metal powders are obtained by known processes, including: reducing a composite organic acid salt (typically, oxalate) with a reducing gas such as hydrogen; reducing an iron oxide with a reducing gas such as hydrogen into Fe or Fe—Co particles or the like; thermally decomposing a metal carbonyl compound; reducing an aqueous ferromagnetic metal solution with a reducing agent such as sodium boron hydride, hypophosphite or hydrazine; or evaporating a metal in a low-pressure inert gas into fine powder. Thus obtained ferromagnetic metal powders can be used after subjected to any of known slow oxidation treatments, such as dipping in an organic solvent followed by drying; dipping in an organic solvent and then feeding an oxygen-containing gas to form an oxide film on the surface followed by drying; or controlling the partial pressures of an oxygen gas and an inert gas to form an oxide film on the surface without using an organic solvent.

The specific surface area according to the BET method of ferromagnetic metal powders used in magnetic layers of the present invention is preferably selected in the range of 30–50 m$^2$/g. This ensures good surface properties and low noise at the same time.

Ferromagnetic metal powders preferably have an acicular shape, especially a flat acicular shape as described in JP-A No. 340805/98, but may also have the shape of a grain, rice grain or plate.

The average major axis length of ferromagnetic metal powders is preferably 0.05–0.15 μm, more preferably 0.08–0.12 μm.

Said major axis length is determined by appropriately combining the method of directly reading the minor axis length and the major axis length of a ferromagnetic powder from transmission electron microphotographs and the method of reading these length by tracing transmission electron microphotographs using an image analyzer, IBASSI, manufactured by Carl Zeiss, Inc.

The aspect ratio of ferromagnetic metal powders is preferably 4–18, more preferably 5–12. The moisture content of ferromagnetic metal powders is preferably 0.01–2%. The moisture content of ferromagnetic metal powders is preferably optimized depending on the nature of the binder.

The pH of ferromagnetic metal powders is preferably optimized depending on the binder used in combination, in the range of 4–12, preferably 7–10. If desired, ferromagnetic metal powders may have Al, Si, P or oxides thereof or the like be on their surfaces. The amount thereof is preferably 0.1–10% by weight of the ferromagnetic metal powders because adsorption of lubricants such as fatty acids becomes 100 mg/m$^2$ or less after surface treatments. Ferromagnetic metal powders may contain soluble inorganic ions such as Na, Ca, Fe, Ni or Sr at 200 ppm or less without significant influence on characteristics.

Ferromagnetic metal powders used in the present invention preferably have less voids, such as 20% by volume or less, more preferably 5% by volume or less.

Known binders can be used in upper magnetic layers, as described in Japanese Patent Nos. 2566096 and 2571351, for example. These binders preferably contain a functional group promoting adsorption to magnetic powders (such as SO$_3$M, PO$_3$M) and preferably further contain an epoxy group. Binders present in magnetic layers preferably contain said polar groups to readily and homogeneously disperse ferromagnetic powders. These binders have a molecular weight of 10,000–100,000, preferably 20,000–60,000. They are used in an amount of 5–25 parts, preferably 5–20 parts, more preferably 5–15 parts per 100 parts by weight of magnetic powders.

Suitable thermoplastic resins for use as binders in magnetic layer have a glass transition temperature of −100 to 150° C., a number average molecular weight of 1,000 to 200,000, preferably 10,000 to 100,000, and a polymerization degree of about 50 to 1,000. Examples thereof include polymers or copolymers containing vinyl chloride, vinyl acetate, vinyl alcohol, maleic acid, acrylic acid, acrylates, vinylidene chloride, acrylonitrile, methacrylic acid, methacrylates, styrene, butadiene, ethylene, vinyl butyral, vinyl acetal, vinyl ethers or the like as base units; polyurethane resins; and various rubber-based resins.

Suitable thermosetting resins or reactive resins for use as binders in magnetic layers include phenol resins, epoxy resins, polyurethane thermosetting resins, urea resins, melamine resins, alkyd resins, acrylic reactive resins, formaldehyde resins, silicone resins, epoxy-polyamide resins, mixtures of polyester resins and isocyanate prepolymers, mixtures of polyester polyols and polyisocyanates, mixtures of polyurethanes and polyisocyanates and the like. These resins are described in detail in "Plastic Handbook", published by Asakura Shoten. Known electron radiation curing resins can also be used in magnetic layers.

Examples of these resins and preparation processes thereof are described in detail in JP-A no. 256219/87.

These resins can be used alone or in combination. Preferred are combinations of a polyurethane resin or a polyisocyanate with at least one member selected from vinyl chloride resins, vinyl chloride-vinyl acetate resins, vinyl chloride-vinyl acetate-vinyl alcohol resins, vinyl chloride-vinyl acetate-maleic anhydride copolymers. Polyurethane resins may have a known structure such as polyester-polyurethane, polyether-polyurethane, polyether-polyester-polyurethane, polycarbonate-polyurethane, polyester-polycarbonate-polyurethane, polycaprolactone-polyurethane, polyolefin-polyurethane or the like. Especially preferred are polyurethanes consisting of a short-chain diol having a cyclic structure and a long-chain diol containing an ether group as mentioned above. If desired, all the binders shown here may preferably contain at least one polar group selected from —COOM, —SO$_3$M, —OSO$_3$M, —P=O(OM)$_2$, —O—P=O(OM)$_2$ (where M represents a hydrogen atom or an alkali metal), —OH, —NR$_2$, =N$^+$R$_3$ (where R represents a hydrocarbon group), an epoxy group, —SH, —CN, sulfobetaine, phosphobetaine, carboxybetaine or the like introduced via copolymerization or addition reaction to obtain more excellent dispersibility and durability. The amount of such polar groups is preferably $10^{-1}$ to $10^{-8}$ mol/g, more preferably $10^{-2}$ to $10^{-6}$ mol/g.

Specific examples of these binders used in the present invention include VAGH, VYHH, VMCH, VAGF, VAGD, VROH, VYES, VYNC, VMCC, XYHL, XYSG, PKHH, PKHJ, PKHC and PKFE manufactured by Union Carbide Corporation; MPR-TA, MPR-TA5, MPR-TAL, MPR-TSN, MPR-TMF, MPR-TS, MPR-TM and MPR-TAO manufactured by Nissin Chemical Industry Co., Ltd.; 1000W, DX80, DX81, DX82, DX83 and 100FD manufactured by Denki Kagaku Kogyo K.K.; MR-104, MR-105, MR110, MR100 and 400X-110A manufactured by Nippon Zeon Co., Ltd.; Nippollan N2301, N2302 and N2304 manufactured by Nippon Polyurethane Industry Co., Ltd.; Pandex T-5105, T-R3080, T-5201, Burnock D-400, D-210-80, Crisvon 6109 and 7209 manufactured by Dainippon Ink & Chemicals, Incorporated; Vylon UR8200, UR8300, RV530 and RV280 manufactured by Toyobo Co., Ltd.; Daipheramine 4020, 5020, 5100, 5300, 9020, 9022 and 7020 manufactured by Dainichiseika Color & Chemicals Mfg. Co., Ltd.; MX 5004 manufactured by Mitsubishi Chemical Corporation; Sunprene SP-150 and TIM-3003 manufactured by Sanyo Chemical Industries, Ltd.; Salan F310 and F210 manufactured by Asahi Chemical Industry Co., Ltd. and the like. Among those are preferred MR-104, MR110, UR-8200, UR8300 and UR-8700 as well as polyurethanes having a cyclic structure and an ether group obtained as reaction products of a diol and an organic diisocyanate as main materials.

When a polyurethane is used in the present invention, it preferably has an elongation at break of 100 to 2,000%, a breaking stress of 0.05 to 10 Kg/cm$^2$, and a yield stress of 0.05 to 10 Kg/cm$^2$.

Suitable polyisocyanates for use in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate; products of these isocyanates with polyalcohols; or polyisocyanates producted by condensation of isocyanates. These isocyanates are commercially available under trade names Coronate L, Coronate HL, Coronate 2030, Coronate 2031, Millionate MR and Millionate MTL from Nippon Polyurethane Industry Co. Ltd.; Takenate D-102, Takenate D-110N, Takenate D-200 and Takenate D-202 from Takeda Chemical Industries, Ltd.; Desmodule L, Desmodule IL, Desmodule N and Desmodule HL from Sumitomo Bayer Urethane Co., Ltd. etc., which may be used alone or as a combination of two or more by taking advantage of the difference in curing reactivity in both nonmagnetic and magnetic layers. These polyisocyanates are used normally in the range of 0–50% by weight, preferably 0–30% by weight on the basis of the total weight of binder resins in magnetic layers or normally in the range of 0–40% by weight, preferably 0–25% by weight on the basis of the total weight of binder resins in nonmagnetic layers.

When magnetic recording media of the present invention consist of two or more layers, it is a matter of course that the amount of binder resins, the amounts of vinyl chloride resins, polyurethane resins, polyisocyanates or other resins in binders, the molecular weight of each resin forming magnetic layers, the amount of polar groups or the aforementioned physical properties of resins or other factors can be varied, if necessary, by applying known techniques relating to multilayer magnetic systems.

When a carbon black is added to upper magnetic layers of the present invention, suitable examples are furnace blacks for rubber use, thermal blacks for rubber use, carbon blacks for coloring agents, acetylene blacks or the like. They preferably have a specific surface area of 5–500 m$^2$/g, a DBP oil absorption of 10–400 ml/100 g, a particle diameter of 5 $\mu$m-300 $\mu$m, a pH of 2–10, a moisture content of 0.1–10% by weight and a tap density of 0.1–1 g/ml. Specific examples of carbon blacks used in the present invention include BLACKPEARLS 2000, 1300, 1000, 900, 800, 700 and VULCAN XC-72 manufactured by Cabot Corporation; #80, #60, #55, #50 and #35 manufactured by Asahi Carbon Co., Ltd.; #2400B, #2300, #900, #100, #30, #40 and #10B manufactured by Mitsubishi Chemical Corporation; and CONDUCTEX SC, RAVEN 150, 50, 40 and 15 manufactured by Columbian Chemicals Company. These carbon blacks may be surface-treated with a dispersant or grafted with a resin or partially graphitized on their surfaces. Alternatively, they may be dispersed in a binder before they are added to a magnetic coating. These carbon blacks can be used alone or in combination.

When a carbon black is used, it preferably represents 0.1–30% by weight of the amount of ferromagnetic powders.

Carbon blacks have an antistatic effect, friction coefficient-lowering effect, light protection-conferring effect, film strength-improving effect or the like on magnetic layers depending on the carbon blacks specifically used. Therefore, these carbon blacks used in the present invention can obviously vary in nature, amount and combination from upper magnetic to lower layers to meet the purpose on the basis of the characteristics shown above such as particle size, oil absorption, conductivity or pH. As for carbon blacks that can be used in magnetic layers of the present invention, see "Carbon Black Handbook" edited by Carbon Black Association, for example.

Magnetic layers of magnetic recording medium (1) may contain known abrasives such as $\alpha$-alumina or $Cr_2O_3$ having an average particle diameter of 1/3 or more but 5 times or less the thickness of the magnetic layers in the case of wet-on-wet coating or 1/3 or more but twice or less the thickness of the magnetic layers in the case of wet-on-dry coating. Too large particles may cause thermal asperity. Especially for wet-on-dry coating where abrasives tend to grow into projections, fine particles are more preferred. As for the pH and surface treatments, known techniques can be applied.

Magnetic layers of magnetic recording medium (1) may further contain solid lubricants (carbons of 30 $\mu$m or more in particle diameter) or liquid lubricants such as fatty acids and esters thereof. In magnetic recording medium (1) of the present invention, magnetic layers preferably contain a fatty acid to reduce the friction coefficient of the magnetic layers. The amount of fatty acids in magnetic layers of magnetic recording medium (1) is suitably in the range of 1–50 mg/cm$^3$, preferably 10–50 mg/cm$^3$ expressed as the cyclohexane extraction amount per volume of the magnetic layers. If a nonmagnetic layer is present, the extraction amount represents the sum of the amounts in magnetic and nonmagnetic layers. The extraction amount is determined by stripping certain amounts of magnetic layers or magnetic and nonmagnetic layers and immersing them in boiling cyclohexane for 4 hours, removing residues, distilling off cyclohexane and analyzing the residue by gas chromatography.

Magnetic layers of magnetic recording medium (2) may contain known abrasives such as $\alpha$-alumina or $Cr_2O_3$. Preferably, they have an average particle diameter of 0.15–0.3 $\mu$m and represent 1.5–10 parts by weight per 100 parts by weight of ferromagnetic metal powders when the average thickness of the lower nonmagnetic layer is in the rage of 1–3 $\mu$m. Suitably, they represent 0.5–2.5 parts by weight per 100 parts by weight of ferromagnetic metal powders when the average thickness of the lower nonmagnetic layer is less than 1 $\mu$m. As for the pH and surface treatments of abrasives, known techniques can be applied.

Magnetic layers of magnetic recording medium (2) may further contain solid lubricants (carbons of 30 $\mu$m or more in particle diameter) or liquid lubricants such as fatty acids and esters thereof. In magnetic recording medium (2) of the present invention, magnetic layers preferably contain a fatty acid to improve lubricating effect. The amount of fatty acids in magnetic layers of magnetic recording medium (2) is suitably in the range of 1–50 mg/cm$^3$.

Now, lower nonmagnetic layers are explained in detail.

Magnetic recording media (1) and (2) of the present invention can have a nonmagnetic layer containing a nonmagnetic powder and a binder between the substrate and the magnetic layer.

The nonmagnetic powder preferably has a Mohs hardness of 4 or more. The roughness factor on the surface of the nonmagnetic powder is preferably 0.8–1.5, more preferably 0.9–1.2. The stearic acid (SA) absorption is 1–20 $\mu$mol/m$^2$, more preferably 2–15 $\mu$mol/m$^2$. The wetting heat of the nonmagnetic powder in the lower layer into water at 25° C. is preferably in the range of 20–60 $\mu$J/cm$^2$ (200 erg/cm$^2$–600 erg/cm$^2$). Suitable solvents also have this wetting heat range. Suitably, 1 to 10 water molecules/100 angstroms are present on the surface at 100–400° C. The pH of the isoelectric point in water is preferably between 5 and 10.

More specifically, nonmagnetic inorganic powders used in nonmagnetic layers of magnetic recording media (1) and (2) of the present invention may be selected from inorganic compounds such as metal oxides, metal carbonates, metal sulfates, metal nitrides, metal carbides and metal sulfides. Suitable inorganic compounds include, for example, $\alpha$-alumina having an $\alpha$-conversion degree of 90% or more, $\beta$-alumina, $\gamma$-alumina, $\theta$-alumina, silicon carbide, chromium oxide, cerium oxide, $\alpha$-iron oxide, goethite, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate and molybdenum disulfide, which can be used alone or in combination. Especially preferred are titanium dioxide, zinc oxide, iron oxide and barium sulfate, among which titanium dioxide and $\alpha$-iron oxide are more preferred.

These nonmagnetic inorganic powders preferably have a particle size of 3 µm or less, but the same effect can be obtained by combining nonmagnetic inorganic powders having different particle sizes or by widening the particle diameter distribution of even a single nonmagnetic inorganic powder, if necessary. Especially preferred nonmagnetic inorganic powders have a particle size of 0.01 µm to 0.2 µm. Particularly when nonmagnetic inorganic powders are particulate metal oxides, the average particle size is preferably 0.08 µm or less. Acicular metal oxides preferably have a major axis length of 0.3 µm or less, more preferably 0.2 µm or less. The particle size of nonmagnetic inorganic powders is determined in the same manner as described above for ferromagnetic metal powders. The tap density is 0.05–2 g/ml, preferably 0.2–1.5 g/ml. The moisture content of nonmagnetic inorganic powders is 0.1–5% by weight, preferably 0.2–3% by weight, more preferably 0.3–1.5% by weight. The pH of nonmagnetic inorganic powders is 2–11, most preferably 7–10. The specific surface area of nonmagnetic inorganic powders is 1–100 m$^2$/g, preferably 5–70 m$^2$/g, more preferably 10–65 m$^2$/g. The crystallite size of nonmagnetic inorganic powders is preferably 0.004 µm-1 µm, more preferably 0.04 µm-0.1 µm. The oil absorption utilizing dibutyl phthalate (DBP) is 5–100 ml/100 g, preferably 10–80 ml/100 g, more preferably 20–60 ml/100 g. The specific gravity is 1–12, preferably 3–6. They may have any of acicular, spherical, polygonal and plate-like shapes.

It is considered that ignition loss is preferably 20% by weight or less, most preferably zero. The aforementioned nonmagnetic inorganic powders used in the present invention preferably have a Mohs hardness of 4 or more but 10 or less. The roughness factor on the surfaces of these powders is preferably 0.8–1.5, more preferably 0.9–1.2. The SA (stearic acid) absorption of nonmagnetic inorganic powders is 1–20 µmol/m$^2$, preferably 2–15 µmol/m$^2$. The wetting heat of nonmagnetic inorganic powders in water at 25° C. is preferably in the range of 20–60 µJ/cm$^2$ (200 erg/cm$^2$–600 erg/cm$^2$). Suitable solvents also have this wetting heat range. Suitably, 1 to 10 water molecules/100 angstroms are present on the surface at 100–400° C. The pH of the isoelectric point in water is preferably between 3 and 9.

These nonmagnetic inorganic powders are preferably surface-treated to contain $Al_2O_3$, $SiO_2$, $TiO_2$, $ZrO_2$, $SnO_2$, $Sb_2O_3$ or ZnO on their surfaces. Especially preferred for dispersibility are $Al_2O_3$, $SiO_2$, $TiO_2$ and $ZrO_2$, more preferably $Al_2O_3$, $SiO_2$ and $ZrO_2$. These may be used in combination or alone to form a surface-coating layer by coprecipitation or depositing alumina at first on the surfaces of the powders and then silica or vice versa depending on the purpose. The surface-coating layer may be a porous for some purposes, but preferably homogeneous and dense in general. Such nonmagnetic inorganic powders are described in JP-A Nos. 177714/98, 170003/97 and 192248/95, for example.

Specific examples of nonmagnetic inorganic powders used in nonmagnetic layers of magnetic recording media (1) and (2) of the present invention include Nanotite manufactured by Showa Denko K.K.; HIT-100 and ZA-G1 manufactured by Sumitomo Chemical Co. Ltd.; DPN-250, DPN-250BX, DPN-245, DPN-270BX, DPB-550BX and DPN-550RX manufactured by Toda Kogyo Corp.; titanium oxide TTO-51B, TTO-55A, TTO-55B, TTO-55C, TTO-55S, TTO-55D, SN-100, MJ-7, α-iron oxide E270, E271 and E300 manufactured by Ishihara Sangyo Kaisha, Ltd.; STT-4D, STT-30D, STT-30 and STT-65C manufactured by Titan Kogyo K.K.; MT-100S, MT-100T, MT-150W, MT-500B, MT-600B, MT-100F and MT-500HD manufactured by Tayca Corporation; FINEX-25, BF-1, BF-10, BF-20 and ST-M manufactured by Sakai Chemical Industry Co., Ltd.; DEFIC-Y and DEFIC-R manufactured by Dowa Mining Co., Ltd.; AS2BM and TiO2P25 manufactured by Nippon Aerosil Co., Ltd.; 100A and 500A manufactured by Ube Industries, Ltd.; and Y-LOP manufactured by Titan Kogyo K.K.; as well as sintered products thereof.

Especially preferred nonmagnetic inorganic powders are titanium dioxide and α-iron oxide. The α-iron oxide (hematite) is prepared under the following conditions. α-$Fe_2O_3$ powders are prepared via precursor acicular goethite particles obtained by: (1) an oxidation reaction in which a suspension containing a ferrous hydroxide colloid obtained by adding an equivalent amount or more of an aqueous alkali hydroxide solution to an aqueous ferrous solution is bubbled with an oxygen-containing gas at pH 11 or higher and a temperature of 80° C. or less to generate acicular goethite particles; (2) an oxidation reaction in which a suspension containing $FeCO_3$ obtained by reacting an aqueous ferrous salt solution with an aqueous alkali carbonate solution is bubbled with an oxygen-containing gas to generate spindle-like goethite particles; (3) an oxidation reaction in which an aqueous ferrous salt solution containing a ferrous hydroxide colloid obtained by adding less than an equivalent amount of an aqueous alkali hydroxide solution or an aqueous alkali carbonate solution to an aqueous ferrous solution is bubbled with an oxygen-containing gas to generate acicular goethite nuclear particles, and then an aqueous alkali hydroxide solution is added to said aqueous ferrous salt solution containing said acicular goethite nuclear particles in an amount equivalent or more to $Fe^{2+}$ in said aqueous ferrous salt solution and then the mixed solution is bubbled with an oxygen-containing gas to grow said acicular goethite nuclear particles; or (4) an oxidation reaction in which an aqueous ferrous salt solution containing a ferrous hydroxide colloid obtained by adding less than an equivalent amount of an aqueous alkali hydroxide solution or an aqueous alkali carbonate solution to an aqueous ferrous solution is bubbled with an oxygen-containing gas to generate acicular goethite nuclear particles, which are then grown in an acid or a neutral zone.

Heterogeneous elements such as Ni, Zn, P or Si commonly added to improve characteristics of granulated powders or the like may be added during the generation reaction of goethite particles without any inconvenience.

Precursor acicular goethite particles are dehydrated at a temperature range of 200–500° C. and, if necessary, annealed by heat treatment at a temperature range of 350–800° C. to give acicular α-$Fe_2O_3$ particles. Anti-sintering agents containing P, Si, B, Zr, Sb or the like may be deposited on the surfaces of acicular goethite particles to be dehydrated or annealed without any inconvenience. Annealing involves heat treatment at a temperature range of 350–800° C. because it is preferred that voids on the surfaces of acicular α-$Fe_2O_3$ particles obtained after dehydration should be filled with the outermost surfaces of the particles molten by annealing to provide a smooth surface profile.

Said acicular α-$Fe_2O_3$ particles obtained by hydration or annealing are dispersed in an aqueous solution to give a suspension, which is combined with an Al compound, for example, and pH-adjusted and coated on the surfaces of said α-$Fe_2O_3$ particles followed by filtration, rinsing, drying, grinding and, if necessary, further deaeration and compaction or the like. Suitable Al compounds are aluminum salts such as aluminum acetate, aluminum sulfate, aluminum chloride or aluminum nitrate, and alkali aluminates such as sodium aluminate. The amount of Al compounds added here is normally 0.01–50% by weight expressed as Al on the basis of $\alpha\text{-}Fe_2O_3$ particle powders. In addition to Al compounds, one or more members selected from Si compounds or P, Ti, Mn, Ni, Zn, Zr, Sn and Sb compounds may also be used for coating. The amount of each of these compounds added in combination with Al compounds is normally in the range of 0.01–50% by weight on the basis of $\alpha\text{-}Fe_2O_3$ particle powders.

Titanium dioxide is prepared by the following processes. These processes mainly include the sulfate process and the chlorine process. The sulfate process comprises digesting ilmenite base ore with sulfuric acid to extract Ti, Fe and the like as sulfates. Iron sulfate is crystallized out, and the remaining titanyl sulfate solution is purified by filtration and then thermally hydrolyzed to deposit hydrous titanium oxide. After filtering and washing, contaminant impurities are washed off and then particle diameter modifiers or the like are added. Then, the material is baked at 800–1000° C. to give crude titanium oxide. The crude titanium oxide may be rutile type or anatase type depending on the nature of the nucleating agent added during hydrolysis. The crude titanium oxide is worked up by crashing, granulation, surface treatments or the like. The chlorine process uses natural rutile or synthetic rutile as base ore. The ore is chlorinated under a high-temperature reducing condition to convert Ti into $TiCl_4$ and Fe into $FeCl_2$ and the iron oxide solidified by cooling is separated from liquid $TiCl_4$. Thus obtained crude $TiCl_4$ is refined by rectification, and then combined with a nucleating agent and instantaneously reacted with oxygen at a temperature of 100° C. or more to give crude titanium oxide. The crude titanium oxide generated in this oxidative decomposition step is worked up to confer pigment-like properties in the same manner as described for the sulfate process.

In advance of surface treatments, said titanium oxide stock is dry-ground and then wet-ground with water and dispersants, and then coarse particles are screened out by centrifugation. Then, a fine slurry is transferred to a surface treatment vessel, where metal hydroxides are coated on the particle surfaces. First, a predetermined amount of an aqueous solution of a salt of Al, Si, Ti, Zr, Sb, Sn, Zn or the like is added, and then an acid or alkali for neutralizing the solution is added to coat the resulting hydrous oxide on the surfaces of titanium oxide particles. The by-product water-soluble salts are removed by decantation, filtration and washing, and finally, the pH of the slurry is adjusted and the slurry is filtered and washed with pure water. The washed cake is then dried with a spray drier or a band drier. Finally, this dried material is ground by a jet mill into a product. Surface treatments are not limited to the use of aqueous systems, but vapors of $AlCl_3$, $SiCl_4$ may be passed through titanium oxide powder and then water vapor may be introduced. As for other processes for preparing pigments, see G. D. Parfitt and K. S. W. Sing: "Characterization of Powder Surfaces", Academic Press, 1976.

Carbon blacks can be mixed into nonmagnetic layers of magnetic recording media (1) and (2) of the present invention to attain not only known effects such as lowered Rs or decreased light transmittance but also a desired Micro-Vickers hardness. The Micro-Vickers hardness of nonmagnetic layers is normally 25–60 $Kg/mm^2$, preferably 30–50 $Kg/mm^2$ as measured with a thin film durometer HMA-400 manufactured by NEC using a triangular pyramid indenter point made of diamond having a ridge angle of 80° and a point radius of 0.1 $\mu$m. The light transmittance is generally standardized at an infrared absorption at a wavelength around 900 nm of 3% or less, e.g., 0.8% or less for VHS. For this purpose, furnace blacks for rubber use, thermal blacks for rubber use, carbon blacks for coloring agents, acetylene blacks or the like can be used.

Carbon blacks may also be added to nonmagnetic layers of magnetic recording media (1) and (2) of the present invention. In this case, carbon blacks have a specific surface area of, normally 100–500 $m^2/g$, preferably 150–400 $m^2/g$ and a DBP oil absorption of, normally 20–400 ml/100 g, preferably 30–200 ml/100 g. The particle size of carbon blacks is normally 5 $\mu$m–80 $\mu$m, preferably 10–50 $\mu$m, more preferably 10–40 $\mu$m. Generally, carbon black preferably have a pH of 2–10, a moisture content of 0.1–10%, and a tap density of 0.1–1 g/ml. Specific examples of carbon blacks used in the present invention include BLACK PEARLS 2000, 1300, 1000, 900, 800, 880, 700 and VULCAN XC-72 manufactured by Cabot Corporation; #3050B, 3150B, 3250B, #3750B, #3950B, #950, #650B, #970B, #850B and MA-600 manufactured by Mitsubishi Chemical Corporation; CONDUCTEX SC, RAVEN 8800, 8000, 7000, 5750, 5250, 3500, 2100, 2000, 1800, 1500, 1255 and 1250 manufactured by Columbian Chemicals Company; and Ketjen Black EC manufactured by Akzo Nobel. These carbon blacks may be surface-treated with a dispersant or grafted with a resin or partially graphitized on their surfaces. Alternatively, they may be dispersed in a binder before they are added to a coating. These carbon blacks can be used in the range not exceeding 50% by weight of said nonmagnetic inorganic powders and not exceeding 40% by weight of the total weight of the nonmagnetic layer. These carbon blacks can be used alone or in combination.

As for carbon blacks that can be used in nonmagnetic layers, see "Carbon Black Handbook" edited by Carbon Black Association, for example.

Nonmagnetic layers can also contain organic powders for some purposes. Such organic powders include acrylic-styrene resin powders, benzoguanamine resin powders, melamine resin powders and phthalocyanine pigments as well as polyolefin resin powders, polyester resin powders, polyamide resin powders, polyimide resin powders and polyfluoroethylene resins, which can be prepared by the processes described in JP-A Nos. 18564/87 and 255827/85.

Magnetic recording media generally have an undercoat layer consisting of a solvent-soluble polyester in order to improve adhesive force between the substrate and the magnetic layer or the nonmagnetic layer. It generally has a thickness of 0.5 $\mu$m or less.

Binder resins, lubricants, dispersants, additives, solvents, dispersion methods and others used in nonmagnetic layer may be the same as described for magnetic layers. Particularly, the amounts and natures of binders, additives and dispersants can be determined by known techniques relating to magnetic layers.

Binders used in nonmagnetic layers may be the same as exemplified for magnetic layers. However, it is more preferred that they contain a functional group promoting dispersibility (see supra) and have a molecular weight of 20,000–50,000, preferably 30,000–50,000. When the molecular weight is too high, calendering moldability is deteriorated. More effectively, nonmagnetic powders are surface-treated with an aromatic phosphorus compound promoting dispersibility. The details are described in Japanese Patent Nos. 2566088 and 2634792.

The weight of binders present in lower layers B(L) is preferably greater than the weight of binders in upper layers, i.e. 12–30 parts, preferably 15–25 parts per 100 parts by weight the sum of nonmagnetic powders and carbon blacks serving as main components.

Carbon blacks that can be added into nonmagnetic lower layers have an average primary particle diameter of 30 nm or less, preferably 20 nm or less and an oil absorption of 200 ml/100 g or less, preferably 100 ml/100 g or less. They can be added in a carbon:main powder ratio of 1:99–60:40.

Lubricants that can be added are known.

Abrasives can be added to magnetic and nonmagnetic layers of magnetic recording media (1) and (2) of the present invention, and such abrasives are typically known materials having a Mohs hardness of 6 or more such as α-alumina having an α-conversion degree of 90% or more, β-alumina, silicon carbide, chromium oxide, cerium oxide, α-iron oxide, corundum, artificial diamond, silicon nitride, silicon carbide, titanium carbide, titanium dioxide, silicon dioxide and boron nitride, which can be used alone or in combination. Complexes of these abrasives may also be used (which are obtained by surface-treating one abrasive with another abrasive). These abrasives may sometimes contain other compounds or elements than main components, but the effect is not affected so far as main components represent 90% by weight or more. Abrasives preferably have a tap density of 0.3–2 g/cc, a moisture content of 0.1–5% by weight, a pH of 2–11 and a specific surface area of 1–30 $m^2/g$. Abrasives used in magnetic recording media (1) and (2) of the present invention may have any of acicular, spherical and cubic shapes, but preferably have a partially angular shape to provide high abrasive properties. Specific examples of abrasives used in magnetic recording media (1) and (2) of the present invention include AKP-20, AKP-30, AKP-50, HIT-50, HIT-60A, HIT-70, HIT-80, HIT-80G and HIT-100 manufactured by Sumitomo Chemical Co., Ltd.; G5, G7 and S-1 manufactured by Nippon Chemical Industrial Co., Ltd.; and TF-100 and TF-140 manufactured by Toda Kogyo K.K. Abrasives used in the present invention can obviously vary in nature, amount and combination from (upper and lower) magnetic to nonmagnetic layers to meet the purpose. These abrasives may be preliminarily dispersed in a binder before they are added into a magnetic coating.

Each layer of magnetic recording media (1) and (2) of the present invention may contain various additives having a lubricating effect, antistatic effect, dispersing effect, plasticizing effect or the like. Suitable additives include molybdenum disulfide; tungsten-graphite disulfide; boron nitride; graphite fluoride; silicone oils; silicones having a polar group; fatty acid-modified silicones; fluorine-containing silicones; fluorine-containing alcohols; fluorine-containing esters; polyolefins; polyglycols; alkyl phosphoric esters and alkali metal salts thereof; alkyl sulfuric esters and alkali metal salts thereof; polyphenyl ethers; fluorine-containing alkyl sulfuric esters and alkali metal salts thereof; C10–24 monobasic fatty acids optionally branched and optionally containing an unsaturated bond and metal (e.g., Li, Na, K, Cu) salts thereof; C12–22 monohydric, dihydric, trihydric, tetrahydric, pentahydric and hexahydric alcohols optionally branched and optionally containing an unsaturated bond; C12–22 alkoxy alcohols; monofatty acid esters or difatty acid esters or trifatty acid esters formed from a C10–24 monobasic fatty acid optionally branched and optionally containing an unsaturated bond and any one of C2–12 monohydric, dihydric, trihydric, tetrahydric, pentahydric and hexahydric alcohols optionally branched and optionally containing an unsaturated bond; fatty acid esters of monoalkyl ethers of alkylene oxide polymers; C8–22 fatty acid amides; and C8–22 aliphatic amines.

Specific examples of these additives include lauric acid, myristic acid, palmitic acid, stearic acid, behenic acid, butyl stearate, oleic acid, linolic acid, linolenic acid, elaidic acid, octyl stearate, amyl stearate, iso-octyl stearate, octyl myristate, butoxyethyl stearate, anhydrosorbitan monostearate, anhydrosorbitan distearate, anhydrosorbitan tristearate, oleyl alcohol, and lauryl alcohol. Other suitable additives include nonionic surfactants based on alkylene oxides, glycerin, glycidol or alkyl phenol-ethylene oxide adducts etc.; cationic surfactants based on cyclic amines, ester amides, quaternary ammonium salts, hydantoin derivatives, heterocycles, phosphonium or sulfoniums etc.; anionic surfactants containing an acidic group such as carboxylic acid, sulfonic acid, phosphoric acid, sulfuric ester and phosphoric ester groups; and ampholytic surfactants based on amino acids, amino sulfonic acids, sulfuric or phosphoric esters of amino alcohols or alkyl betaines.

These surfactants are described in detail in "Surfactants Handbook" (published by Sangyo Tosho Co., Ltd.). These lubricants, antistatic agents or the like need not be 100% pure but may contain impurities such as isomers, unreacted materials, side reaction products, decomposition products and oxides in addition to main components. The content of these impurities is preferably 30% or less, more preferably 10% or less.

These lubricants and surfactants used in magnetic recording media (1) and (2) of the present invention can vary in nature and amount from lower to upper magnetic layers, if desired. For examples, fatty acids having different melting points or esters having different boiling points or polarities can be used in lower and upper magnetic layers to control bleed-through, or the amount of surfactants can be adjusted to improve coating stability, or the amount of lubricants added to nonmagnetic layers can be increased to improve a lubricating effect, though these examples are not limitative as a matter of course. Additives used in magnetic recording media (1) and (2) of the present invention may be totally or partially added in any step of the preparation process of magnetic coatings. For example, they may be mixed with ferromagnetic powders before kneading, or may be added during the step where ferromagnetic powders, binders and solvents are kneaded, or may be added during or after dispersion, or may be added immediately before coating. For some purposes, additives may be partially or totally applied by simultaneous or sequential coating after magnetic layers have been applied. For other purposes, lubricants may be applied on the surfaces of magnetic layers after completion of calendering or slitting.

Commercial products of these lubricants used in magnetic recording media (1) and (2) of the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, Hydrogenated Castor Oil Fatty Acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion 0-2, Nonion LP-20R, Nonion PP-40R, Nonion SP-60R, Nonion OP-80R, Nonion OP-85R, Nonion LT-221, Nonion ST-221, Nonion OT-221, Monogly MB, Nonion DS-60, Anon BF, Anon LG, Butyl Stearate, Butyl Laurate and Erucic Acid manufactured by NOF Corporation; Oleic Acid manufactured by Kanto Chemical Co., Ltd.; FAL-205 and FAL-123 manufactured by Takemoto Oil & Fat Co., Ltd.; NJLUB LO, NJLUB IPM and Sansosyzer E4030 manufactured by New Japan Chemical Co., Ltd.; TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-22-

980, KF-101, KF-102, KF-103, X-22-3710, X-22-3715, KF-910 and KF-3935 manufactured by Shin-Etsu Chemical Co., Ltd.; Armid P, Armid C and Armoslip CP manufactured by Lion Armour Co., Ltd.; Duomine TDO manufactured by Lion Corporation; BA-41G manufactured by Nisshin Oil Mills, Ltd.; Profan 2012E, Newpol PE61, Ionet MS-400, Ionet MO-200, Ionet DL-200, Ionet DS-300, Ionet DS-1000 and Ionet DO-200 manufactured by Sanyo Chemical Industries, Ltd.

Organic solvents used in magnetic recording media (1) and (2) of the present invention include ketones such as acetone, methyl ethyl ketone, methyl isobutyl ketone, diisobutyl ketone, cyclohexanone, isophorone and tetrahydrofuran; alcohols such as methanol, ethanol, propanol, butanol, isobutyl alcohol, isopropyl alcohol and methylcyclohexanol; esters such as methyl acetate, butyl acetate, isobutyl acetate, isopropyl acetate, ethyl lactate and glycol acetate; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chloroform, ethylene chlorohydrin and dichlorobenzene; N,N-dimethylformamide; and hexane, which may be used in any ratio. These organic solvents need not be 100% pure but may contain impurities such as isomers, unreacted materials, side reaction products, decomposition products, oxides and moisture in addition to main components. The content of these impurities is preferably 30% or less, more preferably 10% or less. Organic solvents used in the present invention are preferably the same type in magnetic and nonmagnetic layers, but may be added in varying amounts. A solvent having a high surface tension such as cyclohexane or dioxane is used in nonmagnetic layers to increase coating stability, more specifically, it is important that the arithmetic mean of solvent compositions in upper layers is not less than the arithmetic mean of solvent compositions in lower layers. Somewhat high polarity is preferred to improve dispersibility, so that solvent compositions preferably contain 50% or more of solvents having a permittivity of 15 or more. The dissolution parameter is preferably 8–11.

Magnetic recording media (1) and (2) of the present invention have the following thickness structure. The nonmagnetic flexible substrate suitably has a thickness of 1–100 µm, preferably 4–80 µm. An undercoat layer may be provided between the nonmagnetic flexible substrate and the magnetic layer (without nonmagnetic layer) or nonmagnetic layer to improve adhesion. The undercoat layer suitably has a thickness of 0.01–2 µm, preferably 0.02–0.5 µm. A back coat layer may be provided on the side of the nonmagnetic flexible substrate opposite to the magnetic layer. The back coat layer suitably has a thickness of 0.1–2 µm, preferably 0.3–1.0 µm. Known materials can be used as these undercoat and back coat layers.

Suitable nonmagnetic flexible substrates for use in magnetic recording media (1) and (2) of the present invention may be known films made of polyesters such as polyethylene terephthalate, polyethylene naphthalate; polyolefins; cellulose triacetate; polycarbonates; polyamides; polyimides; polyamide-imides; polysulfons; aramids; aromatic polyamides, etc. These substrates may be preliminarily subjected to corona discharge treatment, plasma treatment, adhesion-enhancing treatment, heat treatment, dust removal or the like. In order to achieve the objects of the present invention, it is necessary to use nonmagnetic flexible substrates having a power spectral density (PDS) of 0.5 nm$^2$ or less, preferably 0.4 nm$^2$ or less, more preferably 0.3 nm$^2$ or less at a wavelength of 1–5 µm or a power spectral density (PDS) of 0.02–0.5 nm$^2$, preferably 0.04–0.3 nm$^2$ at a wavelength of 0.5–1 µm in surface roughness spectra measured with an AFM (Atomic Force Micro Scope). The profile of surface roughness can be freely controlled by changing the size and amount of fillers added to substrates or applying said fillers dispersed in binders. Examples of these fillers include oxides or carbonates of Ca, Si, Ti or the like and acrylic or other organic fine powders.

Nonmagnetic substrates used in magnetic recording media (1) and (2) of the present invention in the form of a tape have a Young's modulus in MD of 400–1500 kg/mm$^2$, preferably 500–1300 kg/mm$^2$ and a Young's modulus in TD of 500–2000 kg/mm$^2$, preferably 700–1800 kg/mm$^2$ with the TD/MD ratio being 1/1–1/5, preferably 1/1–1/3.

The thermal shrinkage of substrates in the tape running direction and width direction is preferably 3% or less, more preferably 1.5% or less at 100° C. for 30 minutes, or preferably 1% or less, more preferably 0.5% or less at 80° C. for 30 minutes. The break strength in both directions is preferably 5–100 kg/mm$^2$.

The process for preparing magnetic coatings for magnetic recording media (1) and (2) of the present invention comprises at least a kneading step, a dispersing step and a mixing step optionally performed before or after the former steps. Each step may be performed in two or more stages. All the materials used in the present invention such as ferromagnetic powders, binders, carbon blacks, abrasives, antistatic agents, lubricants and solvents may be added at the beginning of or during any steps. Moreover, divided portions of each material may be added in two or more steps. For example, divided portions of polyurethane may be added at the kneading step, the dispersing step, and the mixing step for controlling viscosity after dispersion.

Although it is a matter of course that known manufacturing techniques can be applied as a part of the process to achieve the first and second objects of the present invention, the high residual magnetic flux densities (Br) of magnetic recording media (1) and (2) of the present invention could be first obtained by using an apparatus having a high kneading power such as continuous kneader or pressure kneader. When a continuous kneader or a pressure kneader is used, ferromagnetic powders are kneaded with all or a part of binders (preferably 30% or more of the total weight of binders) in the range of 15–500 parts by weight per 100 parts by weight of the ferromagnetic metal powders. The details of these kneading processes are described in JP-A No. 106338/89 and 79274/89. For preparing a solution for lower nonmagnetic layers, it is desirable to use dispersion media having a high specific gravity such as zirconia beads.

The following structures can be proposed as examples of the apparatus and method for applying a multilayer magnetic recording medium such as magnetic recording media (1) and (2) of the present invention.

1. The lower layer is initially applied using a coater commonly used for magnetic coating such as gravure coater, roller coater, blade coater or extrusion coater, and the upper layer is then applied using a substrate-pressurizing extrusion coater disclosed in JP-B No. 46186/89 and JP-A Nos. 238179/85 and 265672/90 while the lower layer is still wet.

2. The upper and lower layers are applied almost simultaneously using a single coating head having two slits for passing coating liquids as disclosed in JP-A Nos. 88080/88, 17971/90 and 265672/90.

3. The upper and lower layers are applied almost simultaneously using an extrusion coater having back-up rolls as disclosed in JP-A No. 174965/90.

In order to prevent electromagnetic characteristics or the like of magnetic recording media from being lowered by aggregation of magnetic particles, coating liquids in the coating head should desirably be subjected to shearing by the method as disclosed in JP-A Nos. 95174/87 and 236968/89. In addition, coating liquids should have a viscosity satisfying the numerical range disclosed in JP-A No. 8471/91. Strong orientation is needed to obtain magnetic recording media of the present invention. It is preferable to use a solenoid of 100 mT (1000 G) or more and a cobalt magnet of 200 mT (2000 G) or more with the facing sides being of the same polarity and to add a mild drying step before orientation to maximize orientability after drying. When the present invention is applied as a disk medium, an orientation method is required rather to randomize orientation. The orientation direction of upper and lower magnetic layers may be shifted in not only the longitudinal or horizontal direction but also the vertical or width direction.

Suitable calender rolls include heat-resistant plastic rolls made of epoxy, polyimide, polyamide, polyimide-amide or the like. A series of metal rolls may also be used. The process temperature is preferably 70° C. or more, more preferably 80° C. or more. The linear pressure is preferably 200 kg/cm or more, more preferably 300 kg/cm or more. The friction coefficient of magnetic recording media of the present invention against SUS420J on the magnetic layer side and the opposite side is preferably 0.5 or less, more preferably 0.3 or less, and the surface specific resistance is preferably from $10^4$–$10^{12}$ ohms/sq. The modulus of elasticity of magnetic layers at 0.5% elongation in both running and width directions is preferably 100–2000 kg/mm$^2$, and the strength at break is preferably 1–30 kg/cm$^2$. The modulus of elasticity of magnetic recording media in both running and width directions is preferably 100–1500 kg/mm$^2$, the residual elongation is preferably 0.5% or less, and the thermal shrinkage at any temperature of 100° C. or below is preferably 1% or less, more preferably 0.5% or less, most preferably 0.1% or less. The glass transition temperature (i.e., the temperature at which the loss elastic modulus of dynamic viscoelasticity measured at 110 Hz is maximum) of magnetic layers is preferably 50° C. or more but 120° C. or less, and that of lower nonmagnetic layers is preferably 0° C. to 100° C. The loss elastic modulus is preferably in the range of $1\times10^3$–$8\times10^4$ N/cm$^2$ ($1\times10^8$–$8\times10^9$ dyne/cm$^2$), and the loss tangent is preferably 0.2 or less. Excessive loss tangents tend to cause adhesion failure.

The residual solvent content in magnetic layers is preferably 100 mg/m$^2$ or less, more preferably 10 mg/m$^2$ or less. The residual solvent content in a second layer is preferably lower than the residual solvent content in a first layer. The void volume of magnetic layers is preferably 30% by volume or less, more preferably 20% by volume or less in both nonmagnetic lower layers and magnetic layers. The void volume is preferably as low as possible to attain high output, but maybe preferably more than specific lower limits for some purposes. For example, higher void volumes are often preferable for better running durability in magnetic recording media for data recording which set importance on repeated use. Magnetic characteristics of magnetic recording media of the present invention are expressed as the squareness in the tape running direction of 0.70 or more, preferably 0.80 or more, more preferably 0.90 or more measured under a magnetic field of 398 d.A/m (5 kOe).

The squarenesses in two directions perpendicular to the tape running direction are preferably 80% or less of the squareness in the running direction. The SFD (Switching Field Distribution) of magnetic layers is preferably 0.6 or less. Magnetic layers have a power spectral density of 0.2 nm$^2$ or less at a wavelength of 1–5 μm and a power spectral density of 0.02–0.1 nm$^2$ at a wavelength of 0.5–1.0 μm in surface roughness spectra. The power spectral density is preferably as low as possible for better CNR, but should be maintained at 0.02–1.0 nm$^2$ in a wavelength range of 0.5–1.0 μm for better running durability.

In magnetic recording media (1) and (2) of the present invention having lower nonmagnetic and upper magnetic layers, these physical characteristics can obviously vary from nonmagnetic to magnetic layers to meet the purpose. For example, magnetic layers may have a relatively high modulus of elasticity to improve running durability while nonmagnetic layers may have a lower modulus of elasticity than that of the magnetic layers to buffer the impact of magnetic recording media against heads. Physical characteristics of two or more magnetic layers can be chosen on the basis of known techniques relating to multilayer magnetic systems. For example, many inventions including those disclosed in JP-B No. 2218/62 and JP-A No. 56228/83 have proposed to use upper magnetic layers having an Hc higher than those of lower layers. The present invention allows recording with magnetic layers having a further higher Hc by making them thinner.

EXAMPLES

The following examples further illustrate the present invention, in which the term "parts" means "parts by weight".

| [Preparation example of magnetic recording medium (1)] | |
|---|---|
| (1) Nonmagnetic lower layer | |
| Nonmagnetic powder α-Fe$_2$O$_3$ | 85 parts |
| Carbon black | 15 parts |
| Average primary particle diameter: 16 mμ | |
| DBP Oil absorption: 80 ml/100 g | |
| pH: 8.0 | |
| Specific surface area (BET): 250 m$^2$/g | |
| Volatile content: 1.5% | |
| Vinyl chloride copolymer | 7 parts |
| (MR-110 manufactured by Nippon Zeon, Co., Ltd.) | |
| Polyurethane resin A (see infra) | |
| Butyl stearate | 1 parts |
| Stearic acid | 1 part |
| Methyl ethyl ketone | 100 parts |
| Cyclohexanone | 50 parts |
| Toluene | 50 parts |
| (2) Magnetic layer | |
| Ferromagnetic metal powder | 100 parts |
| Composition: Fe/Co = 70/30 | |
| Hc: 195.020 A/m (2450 Oe) | |
| Specific surface area (BET): 43 m$^2$/g | |
| Crystallite size: 160 A | |
| Surface-coating compound: Al$_2$O$_3$ | |
| Particle size (major axis diameter): 0.125 μm | |
| Flat acicular particles | |
| Aspect ratio | |
| (longer width (minor axis)/shorter width) = 0.025/0.01 | |
| δs: 157 A.m$^2$/kg | |
| Polyurethane resin A (see infra) | |
| Zirconia powder | Tables 3–6 |
| α-Alumina | Tables 3–6 |
| Carbon black (particle size 0.10 μm) | Tables 3–6 |
| Butyl stearate | 1.5 parts |
| Stearic acid | Tables 3–6 |
| Methyl ethyl ketone | 90 parts |
| Cyclohexanone | 30 parts |
| Toluene | 60 parts |

Synthesis of Polyurethane Resin A

In a vessel equipped with a reflux condenser and a stirrer and preliminarily purged with nitrogen, hydrogenated bisphenol A, a polypropylene oxide addduct of bisphenol A (molecular weight 700), polypropylene glycol (molecular weight 400) and a sodium salt of bis(2-hydroxyethyl) sulfoisophthalate in the molar ratio of 24:14:10:2 were dissolved in a mixed solvent of cyclohexanone and dimethylacetamide in the weight ratio of 50:50 at 60° C. under a nitrogen stream. As a catalyst, di-n-dibutyltin dilaurate was added in an amount of 60 ppm on the basis of the total amount of the starting materials used. Then, MDI (4,4-diphenylmethane diisocyanate) was added in a molar equivalent to the combined diols, and the mixture was heated at 90° C. for 6 hours to give polyurethane resin A of Mw 45000 and Mn 25000 containing 4.0 nmol/g of ether group and $8\times10^{-5}$ mol/g of —$SO_3Na$ group.

For each of the two coating formulations described above, various components were kneaded with a continuous kneader and then dispersed with a sand mill. The resulting dispersion was combined with polyisocyanate in an amount of 3 parts for the coating liquid for nonmagnetic intermediate layers or 1 part for the coating liquid for upper magnetic layers and further combined with 40 parts of a mixed solvent of methyl ethyl ketone and cyclohexanone, and the mixed solution was passed through a filter having an average pore diameter of 1 μm to prepare coating liquids for forming nonmagnetic layers, upper magnetic layers and lower magnetic layers. Then, the resulting coating liquids were applied by simultaneous multilayer coating to form a nonmagnetic layer into a dried thickness shown in Tables 3–6 immediately followed by a magnetic layer into a thickness shown in Tables 3–6 on a polyethylene naphthalate substrate A or B of 5.2 μm in thickness having characteristics shown in Table 1. Both layers still wet were oriented with a cobalt magnet having a magnetic force of 3000 G and a solenoid having a magnetic force of 1500 G and dried, and then passed through a 7-stage calender totally consisting of metal rolls at a temperature of 85° C., a pressure of 350 kg/cm and a speed of 50 m/min and slit in a width of 6.35 mm to prepare a consumer DVC videotape.

Thus obtained video tapes of Examples and Comparative examples were analyzed for characteristics by the following methods and the results are shown in Tables 3–6.

Test Methods

Average Thickness d of Magnetic Layers and Nonmagnetic Layers and Standard Deviation σ

For multilayer structures, average thickness d and standard deviation σ of the thickness were determined as follows.

Each magnetic recording medium is cut out along the longitudinal direction with a diamond cutter into a sample of approximately 0.1 μm in thickness, which is then observed and photographed under a transmission electron microscope at a magnification of 10,000× to 100,000×, preferably 20,000× to 50,000×. The photograph is printed in A4 to A5 sizes. Then, the interface between the magnetic layer and the nonmagnetic layer is visually determined from the difference of the shape of the ferromagnetic metal powder and the nonmagnetic inorganic powder and marked in black, and the surface of the magnetic layer is also marked in black. Then, the lengths of the marking lines are measured with an image processor IBAS2 manufactured by Zeiss Co., Ltd. For 21 cm-long photographs of samples, 85 to 300 measurements are made. The average d is calculated from these measurements to determine the standard deviation σ by the following equation.

$$\sigma=[\{(d1-d)2+(d2-d)2+\ldots+(dn-d)2\}/(n-1)]^{1/2}$$

where d1, d2, ... dn represent individual measurements, and n represents 85 to 300.

Similarly, sample tapes are cut out in the width direction and observed and photographed at a magnification of 500,000× to determine the shape of nonmagnetic particles.

Magnetic Characteristics (Hc, SFD, SQ, Bm, φm)

A vibrating sample magnetometer (manufactured by Toei Kogyo Co., Ltd.) was used under an applied magnetic field Hm of 796 KA/m² (10 KOe). Bm was calculated from the average thickness as measured above and φm of the magnetic layer.

Ra

A sample surface was measured by use of a digital optical profiler HD-2000 manufactured by WYKO, which is a surface roughness meter using optical interferometry, under the condition of objective: ×50, middle lens: ×0.5 and a measured area: 242 μm×184 μm. The measured results were subjected to slope correction and cylindrical correction to obtain basic data. From the basic data, the center surface average roughness Ra (unit: nm) was calculated.

Optical Profiler-PSD (Power Spectral Density)

The data obtained by the measurement of sample surface with HD-2000 were subjected to a high-speed Fourier transform to obtain a relation between a wavelength and a strength. The strength used here was the value calculated by dividing the square of the amplitude corresponding to the wavelength by a frequency, an inverse of the wavelength. This value is referred to hereinafter as "1D-PSD" and expressed in nm³. The 1D-PSD values at the wavelengths of 5 μm and 10 μm were respectively obtained.

AFM: PSD-4.3 μm

A sample surface in a 30 μm×30 μm square was measured with a quadrangular pyramid probe tip made of SiN having a ridge angle of 70° using NanoScope 3 manufactured by Digital Instruments, an Atomic Force Micro Scope (AFM). The resulted data were subjected to a high-speed Fourier transform to obtain a relation between a wavelength and a strength. The strength used here was the square of the amplitude corresponding to the wavelength. This value is referred to hereinafter as "Power" and expressed in nm². The Power at the wavelength of 4.3 μm was obtained.

AFM Surface Projections 40 nm ↑

The number of projections having a height of 40 nm or more from the reference surface was counted in the surface roughness analysis with an AFM described above.

AFM Surface Projections 20 nm ↑

The number of projections having a height of 20 nm or more from the reference surface was counted in the same manner.

Steel Ball Worn Volume (mm³)

The volume of a steel ball of ¼ inch worn by contact with the magnetic layer (worn volume) was determined after 10 runs along the distance of 20 mm (20×10=200 mm) on the magnetic layer under a load of 30 g in an environment at a temperature of 23° C. and a relative humidity of 70%.

RT, SUS303S Mag μ Values 1, 10 and 100 Passes

Each tape was repeatedly passed over an SUS303-0.2S rod of 2 mm φ at a wrap of 90° under a load of 10 g at a speed of 18 mm/sec in an environment at a temperature of 23° C. and a relative humidity of 70% to determine the friction coefficient after 1 pass, 10 passes and 100 passes according to the following Euler's equation where $T_2$ represents the sliding resistance value.

$$\mu = (1/\pi)\ln\left(\frac{T_2}{10}\right)$$

The Above-Defined $\mu$ Value at the First Pass After Storage at 60° C., 90% for 1 week After a virgin tape was stored in its cassette for 1 week in an environment at 60° C., 90%, it was returned to an environment at 23° C., 70% to determine the mag $\mu$ value at the first pass.

DVC Deck, RT (Room Temperature)

After continuous and repeated 100 runs of a virgin tape of 60 minutes (72 m) in length using a cam coder DJ-1 manufactured by Matsushita Electric Industrial Co., Ltd., tape damages and head contamination were observed and evaluated according to the following standards (o is best).

1) Damage to the sliding surface of the tape after 100 passes of running:

x: Damage was visually observed.

Δ: Damage was partially observed by photography at a magnification of 200×.

o: No damage was observed at a magnification of 200×.

2) Damage to the edges of the tape after 100 passes of running: as before.

3) Head contamination after 100 passes of running:

x: Under observation with a Triboscope, contamination was found on the sliding surface of the head (⅕ or more of the sliding surface area).

Δ: Under observation with a Triboscope, contamination on the sliding surface of the head is less than ⅕ of the sliding surface area, but contamination on the shoulder of the head was significant.

o: Under observation with a Triboscope, contamination on the sliding surface of the head was less than ¹⁄₁₀ of the sliding surface area.

DVC ½Tb Output, Total C/N, Medium C/N

½Tb and C/N are measured with a drum tester. An MIG head having a Bs of 1.2 T and a gap length of 0.22 μm was used for recording and reproducing. The reproducing spectrum was observed with a spectrum analyzer manufactured by Shibasoku Co., Ltd. at a head/medium relative speed of 10.5 m/sec during recording and reproducing and a single frequency of 21 MHz. C/N represents the ratio of carrier output at 21 MHz to noise at 18.7 MHz. Medium C/N was calculated by subtracting amplifier noise from total C/N. Electric characteristics are considered as practically acceptable if ½Tb output≧−2 dB and ½ Tb medium CNR≧−7 dB.

TABLE 1

| Base | A | B |
|---|---|---|
| Base Type | PEN | → |
| Base thickness (μm) | 5.2 | → |
| Base Ra on Mag side (nm) | 0.7 | 2.2 |
| Base projections on Mag side (AFM) | | |
| 20 nm↑(number/30 μm × 30 μm square) | 50 | 200 |
| 40 nm↑(number/30 μm × 30 μm square) | 10 | 50 |
| Base roughness on Mag side: AFM-PSD | | |
| 1–5 μm roughness (nm$^2$) | 0.05 or less | 1.5 or less |
| 4.3 μm roughness (nm$^2$) | 0.03 | 1.2 |

TABLE 2

| Zirconia powder | A | B | C | D | E | F | G |
|---|---|---|---|---|---|---|---|
| Type | PSZ ZrO$_2$ alone | → Y$_2$O$_3$— ZrO$_2$ Y$_2$O$_3$: 3 mol % | FSZ → | PSZ Y$_2$O$_3$: 2 mol % | → Y$_2$O$_3$: 3 mol % | → MgO— ZrO$_2$ MgO: 9 mol % | ZrO$_2$ alone |
| Preparation process | Liquid phase Hydrolysis | → | → | → | → Hydrothermal synthesis | → Hydrolysis | Solid phase |
| Calcination temperature time | 800° C. 1 h | → | → | 700 1 h | — | 1100 1 h | — |
| Average primary particle diameter (μm) | 0.04 | 0.05 | 0.05 | 0.02 | 0.01 | 0.1 | 0.5 |
| Specific surface area (m$^2$/g) | 20 | 17 | 17 | 40 | 100 | 8 | 2 |
| Vickers hardness (kgf/mm$^2$) | — | 1300 | 1300 | 1300 | 1300 | 900 | — |
| Fracture toughness (MN/m$^{2/3}$) | — | 8 | 3 | 10 | 8 | 9 | — |
| Density (Specific gravity) (g/cm$^3$) | 6.0 | → | → | → | → | 5.6 | 6.0 |
| Purity (wt %) | 99.5 | 99.9 | 99.9 | 99.9 | 99.8 | 99.9 | 96 |
| Elemental analysis (wt %) | | | | | | | |
| ZrO$_2$ | 99.5 | 94.7 | 94.7 | 96.4 | 94.5 | 96.9 | 96 |
| Y$_2$O$_3$ | — | 5.2 | 5.2 | 3.5 | 5.3 | — | — |
| MgO | — | — | — | — | — | 3.0 | — |
| HfO$_2$ | — | 0.1 | 0.1 | 0.1 | 0.1 | 0.1 | 1.5 |
| SiO$_2$ | 0.1 | — | — | — | — | — | 0.4 |

TABLE 2-continued

| Zirconia powder | A | B | C | D | E | F | G |
|---|---|---|---|---|---|---|---|
| TiO$_2$ | 0.2 | — | — | — | — | — | 0.3 |
| Fe$_2$O$_3$ | 0.1 | — | — | — | — | — | 0.5 |
| Al$_2$O$_3$ | 0.1 | — | — | — | — | — | 0.3 |
| Na$_2$O | — | — | — | — | — | — | 1.0 |

TABLE 3

|  | Ex. 1 | Ex. 2 | Ex. 3 | Ex. 4 | Ex. 5 | Comp. ex. 1 | Comp. ex. 2 |
|---|---|---|---|---|---|---|---|
| Base | A | → | → | → | → | → | → |
| Zirconia powder type | D | → | → | → | → | None | G |
| Zirconia amount in ML | 5 | → | → | 1.5 | → | 0 | 5 |
| Carbon amount in ML | 0 | → | 0.5 | → | → | 0.5 | → |
| Abrasive type in ML | None | α-alumina | → | → | → | α-alumina | → |
| Particle size of abrasive in ML (μm) | — | 0.18 | → | → | → | 0.18 | → |
| Abrasive amount in ML | 0 | 1.5 | → | → | → | 5 | → |
| Binder type in ML | A | → | → | → | → | → | → |
| Binder amount in ML | 10 | → | → | → |  |  |  |
| Fatty acid (SA) amount in ML | 1.5 | → | → | → | → | → | → |
| Layer structure | Multilayer | → | → | → | → | → | → |
| Thickness of upper ML d (μm) | 0.1 | → | → | → | → | → | → |
| Thickness of lower nonmagnetic layer (μm) | 1.4 | → | → | → | 0.4 | 1.4 | → |
| Magnetic characteristics of tape |  |  |  |  |  |  |  |
| Hc (A/m) | 181,488 | 182,284 | 183,080 | 179,896 | 180,692 | 182,284 | 186,264 |
| SFD | 0.17 | 0.18 | 0.19 | 0.17 | 0.16 | 0.19 | 0.22 |
| SQ | 0.91 | 0.90 | 0.89 | 0.91 | 0.91 | 0.89 | 0.87 |
| Bm (mT) | 680 | 670 | 660 | 700 | 640 | 630 | 590 |
| Surface properties of ML: Ra (nm) | 1.8 | 1.9 | 1.9 | 1.8 | 1.6 | 2.0 | 3.0 |
| Optical profiler-PSD: 10 μm (nm$^3$) | 2300 | 2500 | 2700 | 2600 | 2300 | 5500 | 7500 |
| Optical profiler-PSD: 5 μm (nm$^3$) | 760 | 800 | 850 | 800 | 950 | 1300 | 1800 |
| AFM:PSD-4.3 μm (nm$^2$) | 0.1 | 0.12 | 0.13 | 0.12 | 0.16 | 0.22 | 0.41 |
| AFM Surface projections: 5 nm↑ (number/30 μm × 30 μm square) | 5800 | 6000 | 6100 | 6050 | 8000 | 5260 | 5400 |
| AFM Surface projections: 20 nm↑ (number/30 μm × 30 μm square) | 2 | 4 | 10 | 9 | 21 | 12 | 60 |
| Steel ball worn volume: (× 10$^{-6}$ mm$^3$) | 0.6 | 1 | 0.9 | 0.8 | 1.5 | 3 | 2.6 |
| RT,SUS303S mag μ value |  |  |  |  |  |  |  |
| 1 pass | 0.29 | 0.29 | 0.30 | 0.31 | 0.26 | 0.33 | 0.24 |
| 10 passes | 0.25 | 0.28 | 0.28 | 0.29 | 0.23 | 0.35 | 0.22 |
| 100 passes | 0.23 | 0.24 | 0.25 | 0.27 | 0.22 | 0.42 | 0.22 |
| μ value at the first pass after storage at 60° C., 90%, 1 week | 0.34 | 0.34 | 0.34 | 0.34 | 0.28 | 0.36 | 0.7↑ (Adhered) |
| 1) Tape sliding surface damage | Δ | ○ | ○ | ○ | ○ | Δ | ○ |
| 2) Tape edge damage | ○ | ○ | ○ | ○ | ○ | x | ○ |
| 3) Head contamination after 100 passes of running, DVC deck, RT | Δ | ○ | ○ | ○ | ○ | x | Δ |
| DVC 1/2Tb output (dB) | 0.5 | 0.4 | 0.1 | 0.5 | −0.5 | −0.5 | −2 |
| DVC medium C/N (dB) | −1.0 | −1.2 | −1.7 | −1.1 | −2.6 | −3.2 | −5.6 |

ML: magnetic layer

TABLE 4

|  | Ex. 6 | Ex. 7 | Ex. 8 | Ex. 9 | Ex. 10 | Comp. ex. 3 | Comp. ex. 4 |
|---|---|---|---|---|---|---|---|
| Base | A | → | → | → | → | → | → |
| Zirconia powder type | D | → | → | → | B | None | → |

TABLE 4-continued

|  | Ex. 6 | Ex. 7 | Ex. 8 | Ex. 9 | Ex. 10 | Comp. ex. 3 | Comp. ex. 4 |
|---|---|---|---|---|---|---|---|
| Zirconia amount in ML | 5 | → | → | 1.5 | → | 0 | → |
| Carbon amount in ML | 0 | → | 0.5 | → | → | 0.5 | → |
| Abrasive type in ML | None | α-alumina | → | → | → | α-alumina | → |
| Particle size of abrasive in ML (μm) | — | 0.18 | → | → | → | 0.18 | → |
| Abrasive amount in ML | 0 | → | 1.5 | → | → | 5 | → |
| Binder type in ML | A | → | → | → | → | → | → |
| Binder amount in ML | 10 | → | → | → | → | → | → |
| Fatty acid (SA) amount in ML | 1.5 | → | → | → | → | → | → |
| Magnetic Layer structure | Single layer | → | → | → | → | Muti-layer | Single layer |
| Thickness of upper ML d (μm) | 0.5 | → | → | → | → | 0.1 | 0.5 |
| Thickness of lower nonmagnetic layer (μm) | None | → | → | → | → | 0.4 | None |
| Magnetic characteristics of tape |  |  |  |  |  |  |  |
| Hc (A/m) | 178,304 | 179,896 | 180,692 | 177,508 | 177,508 | 183,080 | 179,100 |
| SFD | 0.19 | 0.18 | 0.18 | 0.19 | 0.19 | 0.18 | 0.18 |
| SQ | 0.87 | 0.90 | 0.90 | 0.90 | 0.90 | 0.90 | 0.90 |
| Bm (mT) | 590 | 580 | 595 | 610 | 590 | 575 | 545 |
| Surface properties of ML: Ra (nm) | 2.5 | 2.6 | 2.8 | 2.7 | 3.0 | 2.5 | 3.8 |
| Optical profiler-PSD: 10 μm (nm$^3$) | 5000 | 5200 | 9500 | 9400 | 10900 | 8700 | 34600 |
| Optical profiler-PSD: 5 μm (nm$^3$) | 1400 | 1500 | 2400 | 2300 | 2840 | 2000 | 6920 |
| AFM:PSD-4.3 μm (nm$^2$) | 0.32 | 0.34 | 0.58 | 0.57 | 0.77 | 0.54 | 4.73 |
| AFM Surface projections: 5 nm↑ (number/30 μm × 30 μm square) | 3400 | 3500 | 4300 | 4250 | 4050 | 7100 | 3200 |
| AFM Surface projections: 20 nm↑ (number/30 μm × 30 μm square) | 3 | 15 | 22 | 20 | 21 | 40 | 60 |
| Steel ball worn volume: (× 10$^{-6}$ mm$^3$) | 0.7 | 1.2 | 1 | 0.9 | 0.8 | 4.2 | 4 |
| RT,SUS303S mag μ value |  |  |  |  |  |  |  |
| 1 pass | 0.31 | 0.30 | 0.31 | 0.30 | 0.28 | 0.33 | 0.34 |
| 10 passes | 0.3 | 0.30 | 0.3 | 0.30 | 0.27 | 0.33 | 0.32 |
| 100 passes | 0.3 | 0.30 | 0.3 | 0.30 | 0.27 | 0.3 | 0.32 |
| μ at the first pass after storage at 60° C., 90%, 1 week | 0.32 | 0.32 | 0.32 | 0.32 | 0.30 | 0.36 | 0.36 |
| 1) Tape sliding surface damage | Δ | ○ | ○ | ○ | ○ | Δ | Δ |
| 2) Tape edge damage | Δ | Δ | ○ | ○ | ○ | Δ | Δ |
| 3) Head contamination after 100 passes of running, DVC deck, RT | Δ | ○ | ○ | ○ | ○ | Δ | Δ |
| DVC 1/2 Tb output (dB) | -0.8 | -1.0 | -1.6 | -1.2 | -1.3 | -3.0 | -5 |
| DVC medium C/N (dB) | -4.0 | -4.4 | -5.8 | -5.2 | -5.9 | -7.0 | -12.5 |

ML: magnetic layer

TABLE 5

|  | Ex. 11 | Ex. 12 | Ex. 13 | Ex. 14 | Ex. 15 | Comp. ex. 5 | Comp. ex. 6 |
|---|---|---|---|---|---|---|---|
| Base | A | → | → | → | → | B | → |
| Zirconia powder type | A | C | E | F | → | None | → |
| Zirconia amount in ML | 1.5 | → | → | → | 5 | 0 | → |
| Carbon amount in ML | 0.5 | 0.5 | → | → | → | 0.5 | → |
| Abrasive type in ML | α-alumina | — | → | → | → | α-alumina | → |
| Particle size of abrasive in ML (pm) | 0.18 | → | → | → | 0.25 | 0.18 | → |
| Abrasive amount in ML | 1.5 | → | → | → | 5 | 5 | → |
| Binder type in ML | A | → | → | → | → | → | → |
| Binder amount in ML | 10 | → | → | → | → | → | → |
| Fatty acid (SA) amount in ML | 1.5 | → | → | → | → | → | → |
| Magnetic Layer structure | Single layer | → | → | → | Multilayer | Single layer | Multilayer |

TABLE 5-continued

|  | Ex. 11 | Ex. 12 | Ex. 13 | Ex. 14 | Ex. 15 | Comp. ex. 5 | Comp. ex. 6 |
|---|---|---|---|---|---|---|---|
| Thickness of upper ML d ($\mu$m) | 0.5 | → | → | → | 0.1 | 0.5 | 0.1 |
| Thickness of lower nonmagnetic layer ($\mu$m) | None | → | → | → | 2.5 | None | 4 |
| Magnetic characteristics of tape | | | | | | | |
| Hc (A/m) | 177,508 | 177,508 | 176,712 | 178,304 | 187,060 | 179,100 | 189,448 |
| SFD | 0.19 | 0.19 | 0.19 | 0.20 | 0.24 | 0.18 | 0.26 |
| SQ | 0.90 | 0.90 | 0.90 | 0.89 | 0.86 | 0.90 | 0.84 |
| Bm (mT) | 592 | 589 | 630 | 577 | 660 | 546 | 720 |
| Surface properties of ML: Ra (nm) | 2.9 | 3.0 | 2.5 | 3.3 | 1.9 | 4.4 | 2.2 |
| Optical profiler-PSD: 10 $\mu$m (nm$^3$) | 10500 | 11000 | 7200 | 12500 | 6600 | 50100 | 7430 |
| Optical profiler-PSD: 5 $\mu$m (nm$^3$) | 2620 | 2900 | 1700 | 3000 | 800 | 10000 | 740 |
| AFM:PSD-4.3 $\mu$m (nm$^3$) | 0.72 | 0.78 | 0.4 | 0.84 | 0.11 | 0.35 | 0.09 |
| AFM Surface projections: 5 nm↑ (number/30 $\mu$m × 30 $\mu$m square) | 4080 | 4040 | 4560 | 3920 | 4630 | 3080 | 2970 |
| AFM Surface projections: 20 nm↑ (number/30 $\mu$m × 30 $\mu$m square) | 20 | 22 | 14 | 26 | 7 | 140 | 0 |
| Steel ball worn volume: (× 10$^{-6}$ mm$^3$) | 0.7 | 0.6 | 1 | 0.6 | 5.4 | 4 | 4.8 |
| RT,SUS303S mag $\mu$ value | | | | | | | |
| 1 pass | 0.28 | 0.28 | 0.30 | 0.25 | 0.29 | 0.32 | 0.38 |
| 10 passes | 0.27 | 0.28 | 0.30 | 0.24 | 0.28 | 0.31 | 0.52 |
| 100 passes | 0.30 | 0.28 | 0.30 | 0.24 | 0.28 | 0.31 | over (0.7↑) |
| $\mu$ value at the first pass after storage at 60° C., 90%, 1 week | 0.30 | 0.3 | 0.32 | 0.27 | 0.32 | 0.34 | 0.48 |
| 1) Tape sliding surface damage | Δ | Δ | ○ | ○ | ○ | ○ | x |
| 2) Tape edge damage | ○ | ○ | ○ | ○ | ○ | ○ | x |
| 3) Head contamination after 100 passes of running, DVC deck, RT | Δ | Δ | ○ | ○ | ○ | ○ | x |
| DVC 1/2 Tb output (dB) | −1.2 | −1.4 | −1.1 | −1.6 | 0.6 | −7 | ND |
| DVC medium C/N (dB) | −5.6 | −6.0 | −4.5 | −6.4 | −1.0 | −14 | ND |

ML: magnetic layer

TABLE 6

|  | Ex. 16 | Ex. 17 | Ex. 18 | Ex. 19 | Comp. ex. 7 | Comp. ex. 8 |
|---|---|---|---|---|---|---|
| Base | A | → | → | → | → | → |
| Zirconia powder type | B | E | F | D | None | → |
| Zirconia amount in ML | 5 | → | → | → | 0 | → |
| Carbon amount in ML | 0 | → | → | → | 0 | → |
| Abrasive type in ML | α-alumina | → | → | → | None | → |
| Particle size of abrasive in ML ($\mu$m) | 0.18 | — | → | → | — | → |
| Abrasive amount in ML | 1.5 | → | → | → | 0 | → |
| Binder type in ML | A | → | → | → | → | → |
| Binder amount in ML | 10 | → | → | → | → | → |
| Fatty acid (SA) amount in ML | 1.5 | → | → | 3.0 | → | → |
| Magnetic Layer structure | Multi-layer | → | → | → | 1.5 | Single-layer |
| Thickness of upper ML d ($\mu$m) | 0.1 | → | → | → | → | 0.5 |
| Thickness of lower nonmagnetic layer ($\mu$m) | 1.4 | → | → | → | → | None |
| Magnetic characteristics of tape | | | | | | |
| Hc (A/m) | 182,284 | 181,090 | 182,682 | 180,692 | 180,692 | 178,304 |
| SFD | 0.18 | 0.17 | 0.19 | 0.16 | 0.17 | 0.19 |
| SQ | 0.90 | 0.91 | 0.89 | 0.91 | 0.91 | 0.89 |
| Bm (mT) | 658 | 692 | 643 | 685 | 730 | 640 |
| Surface properties of ML: Ra (nm) | 2.1 | 1.6 | 2.6 | 1.7 | 1.6 | 2.6 |
| Optical profiler-PSD: 10 $\mu$m (nm$^3$) | 3650 | 2140 | 5400 | 2260 | 3300 | 6000 |
| Optical profiler-PSD: 5 $\mu$m (nm$^3$) | 860 | 700 | 940 | 740 | 660 | 760 |

TABLE 6-continued

| | Ex. 16 | Ex. 17 | Ex. 18 | Ex. 19 | Comp. ex. 7 | Comp. ex. 8 |
|---|---|---|---|---|---|---|
| AFM:PSD-4.3 μm (nm²) | 0.13 | 0.08 | 0.15 | 0.09 | 0.07 | 0.09 |
| AFM Surface projections: 5 nm↑ (number/ 30 μm × 30 μm square) | 6400 | 5210 | 6870 | 5780 | 4290 | 2710 |
| AFM Surface projections: 20 nm↑ (number/ 30 μm × 30 μm square) | 8 | 1 | 10 | 2 | 1 | 1 |
| Steel ball worn volume: (×10⁻⁶ nm³) RT,SUS303S | 0.7 | 0.8 | 0.7 | 0.6 | 0.4 | 0.4 |
| mag μ value | | | | | | |
| 1 pass | 0.23 | 0.28 | 0.21 | 0.24 | 0.38 | 0.48 |
| 10 passes | 0.22 | 0.26 | 0.20 | 0.24 | 0.35 | 0.40 |
| 100 passes | 0.21 | 0.25 | 0.20 | 0.23 | 0.42 | 0.52 |
| μ value at the first pass after storage at 60° C., 90%, 1 week | 0.24 | 0.30 | 0.21 | 0.24 | 0.40 | 0.52 |
| 1) Tape sliding surface damage | ○ | Δ | ○ | Δ | ND | ND |
| 2) Tape edge damage | ○ | ○ | ○ | ○ | ND | ND |
| 3) Head contamination after 100 passes of running, DVC deck, RT | ○ | Δ | ○ | Δ | ND | ND |
| DVC 1/2 Tb output (dB) | 0.2 | 0.5 | 0.2 | 0.5 | ND | ND |
| DVC medium C/N (dB) | -1.6 | -0.7 | -1.9 | -1.0 | ND | ND |

ML: magnetic layer

Comparative example 1 relates to a layer structure of upper/lower layer thickness=0.1/1.4 μm with a lower binder content in each layer to enhance calendrering moldability and subjected to a further intensive calendering process.

With a carbon content of 0.5 parts by weight, Ra and the heights of projections on the surface of the magnetic layer are small and a high output can be achieved. However, surface roughness at specific wavelength (PSD around 5 μm for DVC) was high and medium C/N was low with high medium noise. Friction coefficient was high to invite the problems of edge damage and head contamination during repeated running.

Example 1 relates to a multilayer sample containing 5 parts by weight of zirconia powder D with neither carbon nor α-alumina, showing that 5 μm PSD was lowered and medium C/N was improved as compared with Comparative example 1. Friction coefficient was lowered whereby edge damage was reduced and head contamination was improved during repeated running.

Example 2 is similar to Example 1 except that a small amount (1.5 parts by weight) of α-alumina was added, showing that medium C/N is higher than that of Comparative example 1 and that damage to the sliding surface of the magnetic layer can be improved as compared with Comparative example 1 and Example 1.

Example 3 is similar to Example 2 except that 0.5 parts by weight of carbon was added, showing that medium C/N is higher than that of Comparative example 1 and that damage to the sliding surface of the magnetic layer can be improved similarly to Example 2.

Example 4 is similar to Example 3 with a lower zirconia content. Friction coefficient was somewhat higher than that of Example 3. However, as compared with Comparative example 1, medium C/N was higher and friction coefficient was lower whereby damages to the sliding surface and edges were reduced and head contamination was improved during repeated running.

Comparative example 2 is similar to Comparative example 1 except that 5 parts by weight of zirconia powder G was added, showing that tape damages during repeated running can be improved but the surface properties of the magnetic layer were deteriorated and both output and medium C/N were lowered. Another problem was an increase in friction coefficient after storage at high temperature and high humidity.

Comparative example 3 is similar to Comparative example 1 except that the thickness of the lower nonmagnetic layer was reduced to 0.4 μm, showing increased projections, surface roughening and output loss as compared with Comparative example 1.

Example 5 is similar to Example 4 except that the thickness of the lower nonmagnetic layer was reduced to 0.4 μm, showing that output and medium C/N are high and friction coefficient is low whereby damages during repeated running can be improved as compared with Comparative example 3.

Comparative example 4 relates to a sample of a single magnetic layer of 0.5 μm having the magnetic layer formulation of Comparative example 1, showing further increased projections, surface roughening and lower output and medium C/N as compared with Comparative example 3.

Example 6 relates to a sample of a single magnetic layer of 0.5 μm having the magnetic layer formulation of Example 1, showing that output and medium C/N are improved as compared with Comparative example 4.

Example 7 relates to a sample of a single magnetic layer of 0.5 μm having the magnetic layer formulation of Example 2, showing that output and medium C/N are improved as compared with Comparative example 4.

Example 8 relates to a sample of a single magnetic layer of 0.5 μm having the magnetic layer formulation of Example 3, showing that output and medium C/N are improved and damages during repeated running can also be improved as compared with Comparative example 4.

Example 9 relates to a sample of a single magnetic layer of 0.5 μm having the magnetic layer formulation of Example 4, showing that output and medium C/N are improved and damages during repeated running can also be improved as compared with Comparative example 4.

Examples 10–14 are similar to Example 9 except that zirconia powder D was replaced by B, A, C, E and F, respectively. Similarly to Example 9, outputs and medium C/Ns are improved and damages during repeated running can also be improved as compared with Comparative example 4.

Example 15 relates to a layer structure consisting of an upper layer of 0.1 μm and a lower layer of 2.5 μm using a magnetic layer formulation containing 5 parts by weight of a zirconia powder and 5 parts by weight of α-alumina of 0.25 μm in particle diameter as an abrasive, showing that medium C/N is improved and damages during repeated running can also be improved as compared with Comparative example 1.

Comparative example 5 is similar to Comparative example 4 except that the base was replaced by B, showing that output and medium C/N are further lowered as compared with Comparative example 4.

Comparative example 6 is similar to Comparative example 1 except that the base was replaced by B and the thickness of the lower layer was increased to 4 μm. As a result of the increased thickness of the lower layer, projections are decreased and the surface of the magnetic layer becomes smoother, but the durability of the magnetic layer is lowered to such an extent that electric characteristics cannot be determined.

Comparative example 7 is similar to Comparative example 1 except that neither abrasive nor carbon was added, showing that projections on the surface of the magnetic layer are decreased and the surface becomes smoother, but the durability of the magnetic layer is lowered to such an extent that electric characteristics cannot be determined.

Comparative example 8 is similar to Comparative example 4 except that neither abrasive nor carbon was added, showing that projections on the surface of the magnetic layer are decreased and the surface becomes smoother, but the durability of the magnetic layer is lowered to such an extent that electric characteristics cannot be determined, as compared with Comparative example 4.

Examples 16–18 are similar to Example 2 except that zirconia powder D was replaced by B, E and F, respectively, showing that outputs and medium C/Ns are high and friction coefficients are low whereby damages during repeated running can be improved as compared with Comparative example 1.

Example 19 is similar to Example 2 except that the amount of the fatty acid was increased, showing that friction coefficient is lower than that of Example 2. Similarly to Example 2, output and medium C/N are high and damages during repeated running can be improved as compared with Comparative example 1.

[Preparation example of magnetic recording medium (2)]

(1) Nonmagnetic lower layer

| | |
|---|---|
| Nonmagnetic powder α-Fe$_2$O$_3$ | 85 parts |
| Major axis length: 0.14 μm | |
| Acicular ratio: 7 | |
| Specific surface area (BET): 52 m$^2$/g | |
| PH: 9 | |
| Tap density: 0.8 | |
| Al$_2$O$_3$ and SiO$_2$ are present on the surfaces. | |
| Carbon black | 15 parts |
| Average primary particle diameter: 16 mμ | |
| DBP oil absorption: 80 ml/100 g | |
| pH: 8.0 | |
| Specific surface area (BET): 250 m$^2$/g | |
| Volatile content: 1.5% | |
| Vinyl chloride copolymer | 7 parts |
| (MR-110 manufactured by Nippon Zeon, Co., Ltd) | |
| Polyester-polyurethane resin | 5 parts |
| (Neopentyl glycol/caprolactone polyol/ | |
| MDI (4,4'-diphenylmethane-diisocyanate) = | |
| 0.9/2.6/1 | |
| containing 1 × 10$^{-4}$ eq/g of —SO$_3$Na group | |
| Butyl stearate | 1 parts |
| Stearic acid | 1 part |
| Methyl ethyl ketone | 100 parts |
| Cyclohexanone | 50 parts |
| Toluene | 50 parts |

(2) Magnetic layer

| | |
|---|---|
| Ferromagnetic metal powder | 100 parts |
| (see Tables 8, 10 and 11) | |
| Polyester-polyurethane resin | 10 parts |
| (Neopentyl glycol/caprolactone polyol/ | |
| MDI (4,4'-diphenylmethane-diisocyanate) = | |
| 0.9/2.6/1 | |

[Preparation example of magnetic recording medium (2)] -continued

| | |
|---|---|
| containing 1 × 10$^{-4}$ eq/g of —SO$_3$Na group | |
| α-Alumina (particle size 0.3 μm) see Tables 10, 11 | |
| Carbon black (particle size 0.10 μm) | 0.5 parts |
| Butyl stearate | 1.5 parts |
| Stearic acid | 1.5 parts |
| Methyl ethyl ketone | 90 parts |
| Cyclohexanone | 30 parts |
| Toluene | 60 parts |

For each of the two coating formulations described above, various components were kneaded with a continuous kneader and then dispersed with a sand mill. The resulting dispersion was combined with polyisocyanate in an amount of 3 parts for the coating liquid for nonmagnetic intermediate layers or 1 part for the coating liquid for upper magnetic layers and further combined with 40 parts of a mixed solvent of methyl ethyl ketone and cyclohexanone, and the mixed solution was passed through a filter having an average pore diameter of 1 μm to prepare coating liquids for forming nonmagnetic layers, upper magnetic layers and lower magnetic layers. Then, the resulting coating liquids were applied by simultaneous multilayer coating to form a nonmagnetic layer into a dried thickness shown in Tables 10 and 11 immediately followed by a magnetic layer into a thickness shown in Tables 10 and 11 on a polyethylene naphthalate base having the characteristics shown in Table 7. Both layers still wet were oriented with a cobalt magnet having a magnetic force of 300 mT (3000 G) and a solenoid having a magnetic force of 150 mT (1500 G) and dried, and then passed through a 7-stage calender totally consisting of metal rolls at a temperature of 85° C., a pressure of 350 kg/cm and a speed of 50 m/min and slit in a width of 6.35 mm to prepare a consumer DVC videotape.

Thus obtained videotapes of Examples and Comparative examples were analyzed for characteristics by the same methods as described above for the examples of magnetic recording medium (1) and the results are shown in Tables 10 and 11.

TABLE 7

| Base | C |
|---|---|
| Base Type | PEN |
| Base thickness (μm) | 4.7 |
| Base Ra on Mag side (nm) | 0.7 |
| Base projections on Mag side (AFM) | |
| 20 nm↑ (number/30 μm × 30 μm square) | 50 |
| 40 nm↑ (number/30 μm × 30 μm square) | 10 |
| Base roughness on Mag side: AFM-PSD | |
| 1–5 μm roughness (nm$^2$) | 0.05 or less |
| 4.3 μm roughness (nm$^2$) | 0.03 |

TABLE 8

| | | Ferromagnetic powder | | |
|---|---|---|---|---|
| Properties of ferromagnetic powders | | Ferromagnetic metal powder A | Ferromagnetic metal powder B | Ferromagnetic metal powder C |
| Shape | Particle shape | Spindle acicular particle | Flat particle | Spindle acicular particle |
| | Particle section | Circular | Ellipsoidal | Circular |

TABLE 8-continued

| Properties of ferromagnetic powders | | Ferromagnetic powder | | |
|---|---|---|---|---|
| | | Ferromagnetic metal powder A | Ferromagnetic metal powder B | Ferromagnetic metal powder C |
| | Major axis length (μm) | 0.11 | 0.125 | 0.07 |
| | Minor axis length (μm) (longer width) | 0.02 | 0.024 | 0.016 |
| | Crystalline size (A) | 140 | 160 | 120 |
| | Major/minor axis ratio in particle section | 1 | 2.4 | 1 |
| | $S_{BET}$ (m²/g) | 54 | 43 | 70 |
| Elemental analysis (at %) | Co/Fe | 34 | 29 | 24 |
| | Al/Fe | 6.7 | 5.9 | 11.3 |
| | Si/Fe | 3.3 | 0.10 | 0.03 |
| | Y/Fe | 0.01 | 8.3 | 11.2 |
| | Sm/Fe | 3.8 | 0 | 0 |
| | Mg/Fe | 0 | 0.7 | 0.7 |
| | Ca/Fe | 0.01 | 0.03 | 0.03 |
| | Na/Fe | 0.01 | 0 | 0 |
| Magnetic properties | Hc (A/m) | 191,040 | 195,020 | 188,254 |
| | σs (A.m²/kg) | 140 | 158 | 125 |
| | Powder SFD | 0.944 | 0.922 | 0.930 |
| Other properties | pH | 9.0 | 9.1 | 9.4 |

TABLE 9

| Zirconia powder | H | I | J | K |
|---|---|---|---|---|
| Type | PSZ | → | → | ZrO₂ alone |
| | Y₂O₃: 2 mol % | Y₂O₃: 3 mol % | MgO—ZrO₂ MgO: 9 mol % | |
| Preparation process | Liquid phase Hydrolysis | Hydrothermal synthesis | Hydrolysis | Solid phase |
| Calcination temperature | 700° C. | — | 1100 | — |
| time | 1 h | | 1 h | |
| Average primary particle diameter (μm) | 0.02 | 0.01 | 0.1 | 0.5 |
| Specific surface area (m²/g) | 40 | 100 | 8 | 2 |
| Vickers hardness (kgf/mm²) | 1300 | 1300 | 900 | — |
| Fracture toughness (MN/m^{2/3}) | 10 | 8 | 9 | — |
| Density (Specific gravity) (g/cm³) | 6.0 | → | 5.6 | 6.0 |
| Purity (wt %) | 99.9 | 99.8 | 99.9 | 96 |
| Elemental analysis (wt %) | | | | |
| ZrO₂ | 96.4 | 94.5 | 96.9 | 96 |
| Y₂O₃ | 3.5 | 5.3 | — | — |
| MgO | — | — | 3.0 | — |
| HfO₂ | 0.1 | 0.1 | 0.1 | 1.5 |
| SiO₂ | — | — | — | 0.4 |
| TiO₂ | — | — | — | 0.3 |
| Fe₂O₃ | — | — | — | 0.5 |
| Al₂O₃ | — | — | — | 0.3 |
| Na₂O | — | — | — | 1.0 |

TABLE 10

| | Ex. 20 | Ex. 21 | Ex. 22 | Ex. 23 | Ex. 24 | Comp. ex. 9 | Comp. ex. 10 |
|---|---|---|---|---|---|---|---|
| Ferromagnetic powder | B | → | → | A | B | → | → |
| Zirconia powder type | H | → | → | → | → | None | K |
| Zirconia amount in magnetic layer (parts) | 5 | 2 | 1 | 2 | → | 0 | 5 |
| α-alumina amount in magnetic layer (parts) | 0 | 1.5 | → | → | → | 0.5 | 1.5 |
| Thickness of upper magnetic layer d (μm) | 0.1 | → | → | → | → | → | → |
| Thickness of lower nonmagnetic layer (μm) | 1.7 | → | → | → | 0.8 | 1.7 | → |

TABLE 10-continued

|  | Ex. 20 | Ex. 21 | Ex. 22 | Ex. 23 | Ex. 24 | Comp. ex. 9 | Comp. ex. 10 |
|---|---|---|---|---|---|---|---|
| Magnetic characteristics of tape | | | | | | | |
| Hc (A/m) | 181,886 | 183,080 | 183,876 | 180,692 | 183,478 | 182,682 | 184,672 |
| SFD | 0.19 | 0.21 | 0.20 | 0.22 | 0.20 | 0.22 | 0.24 |
| SQ | 0.90 | 0.89 | 0.89 | 0.88 | 0.89 | 0.88 | 0.87 |
| Bm (mT) | 700 | 692 | 705 | 548 | 666 | 646 | 628 |
| Surface properties of magnetic layer: Ra (nm) | 1.6 | 1.9 | 1.9 | 2.0 | 1.7 | 2.2 | 2.8 |
| Optical profiler-PSD: 5 $\mu$m (nm$^3$) | 720 | 800 | 850 | 850 | 1000 | 1840 | 2400 |
| AFM:PSD-4.3 $\mu$m (nm$^2$) | 0.09 | 0.12 | 0.13 | 0.13 | 0.19 | 0.40 | 0.58 |
| AFM Surface projections: 20 nm↑ (number/30 $\mu$m × 30 $\mu$m square) | 8 | 10 | 9 | 14 | 18 | 14 | 36 |
| Steel ball worn volume: (× 10$^{-6}$ mm$^3$) | 0.6 | 5.2 | 4 | 5.4 | 8 | 10 | 6.2 |
| RT,SUS303S mag $\mu$value | | | | | | | |
| 1 pass | 0.27 | 0.29 | 0.29 | 0.28 | 0.24 | 0.33 | 0.26 |
| 10 passes | 0.24 | 0.28 | 0.28 | 0.27 | 0.22 | 0.34 | 0.24 |
| 100 passes | 0.22 | 0.27 | 0.28 | 0.26 | 0.21 | 0.36 | 0.24 |
| 1) Tape sliding surface damage | Δ | ○ | ○ | ○ | ○ | ○ | ○ |
| 2) Tape edge damage | ○ | ○ | ○ | ○ | ○ | x | ○ |
| 3) Head contamination after 100 passes of running, DVC deck, RT | Δ | ○ | ○ | ○ | ○ | Δ | ○ |
| DVC 1/2Tb output (dB) | 0.3 | 0.4 | 0.1 | -0.7 | -0.4 | 0 | -1.5 |
| DVC medium C/N (dB) | -1.1 | -1.2 | -1.7 | -1.1 | -2.6 | -3.7 | -5.7 |

TABLE 11

|  | Ex. 25 | Ex. 26 | Ex. 27 | Ex. 28 | Comp. ex. 11 | Comp. ex. 12 | Comp. ex. 13 |
|---|---|---|---|---|---|---|---|
| Ferromagnetic powder | B | → | → | → | → | C | → |
| Zirconia powder type | I | → | J | → | None | → | H |
| Zirconia amount in magnetic layer (parts) | 2 | → | → | → | 0 | → | 5 |
| α-alumina anount in magnetic layer (parts) | 1.5 | → | → | → | 5 | → | → |
| Thickness of upper magnetic layer d ($\mu$m) | 0.07 | 0.25 | 0.07 | 0.25 | 0.1 | → | → |
| Thickness of lower nonmagnetic layer ($\mu$m) | 1.7 | → | → | → | 0.8 | 1.7 | → |
| Magnetic characteristics of tape | | | | | | | |
| Hc (A/m) | 187,060 | 179,896 | 187,458 | 180,294 | 183,080 | 204,572 | 205,368 |
| SFD | 0.19 | 0.22 | 0.20 | 0.23 | 0.21 | 0.38 | 0.36 |
| SQ | 0.90 | 0.87 | 0.89 | 0.87 | 0.89 | 0.85 | 0.86 |
| Bm (mT) | 745 | 621 | 722 | 604 | 595 | 525 | 498 |
| Surface properties of magnetic layer: Ra (nm) | 1.7 | 2.0 | 1.9 | 2.2 | 2.8 | 2.4 | 2.3 |
| Optical profiler-PSD: $\mu$m (nm$^3$) | 700 | 1280 | 850 | 1490 | 3160 | 2120 | 1910 |
| AFM:PSD-4.3 $\mu$m (mm$^2$) | 0.08 | 0.22 | 0.13 | 0.34 | 0.86 | 0.55 | 0.51 |
| AFM Surface projections: 20 nm↑ (number/30 $\mu$m × 30 $\mu$m square) | 9 | 11 | 13 | 14 | 46 | 10 | 11 |
| Steel ball worn volume: (× 10$^{-6}$ mm$^3$) | 4.8 | 4.4 | 4.6 | 4.2 | 12 | 8.5 | 8.0 |
| RT,SUS303S mag $\mu$value | | | | | | | |
| 1 pass | 0.30 | 0.31 | 0.28 | 0.29 | 0.28 | 0.34 | 0.28 |
| 10 passes | 0.29 | 0.30 | 0.25 | 0.27 | 0.28 | 0.35 | 0.25 |
| 100 passes | 0.28 | 0.30 | 0.25 | 0.27 | 0.29 | 0.37 | 0.24 |
| 1) Tape sliding surface damage | ○ | ○ | ○ | ○ | ○ | Δ | ○ |
| 2) Tape edge damage | ○ | ○ | ○ | ○ | ○ | x | ○ |
| 3) Head contamination after 100 passes of running, DVC deck, RT | ○ | ○ | ○ | ○ | ○ | Δ | ○ |

TABLE 11-continued

|  | Ex. 25 | Ex. 26 | Ex. 27 | Ex. 28 | Comp. ex. 11 | Comp. ex. 12 | Comp. ex. 13 |
|---|---|---|---|---|---|---|---|
| DVC 1/2Tb output (dB) | 0.6 | −0.4 | 0.2 | −0.6 | −2.4 | −1.2 | −1.4 |
| DVC medium C/N (dB) | −0.8 | −3.3 | −1.6 | −3.9 | −7.2 | −5.2 | −5.2 |

As shown in Tables 10 and 11, Comparative example 9 relates to a sample prepared by applying high-σs magnetic material B charged with 5 parts by weight of α-alumina having a particle diameter of 0.3 μm as an abrasive and 0.5 parts by weight of carbon black having a particle diameter of 0.1 μm into a layer structure of upper/lower layer thickness of 0.1/1.7 μm and calendering the assembly under high-pressure conditions. High output is attained, but PSD around 5 μm is high and medium C/N is low with high medium noise. Friction coefficient on Mag side is high to invite the problem of edge damage during repeated running.

Comparative example 10 is similar to Comparative example 9 except that 5 parts by weigh of zirconia powder K having a particle diameter of 0.5 μm was added and the content of α-alumina (particle diameter 0.3 μm) was decreased from 5 to 1.5 parts by weight. As a result of the addition of zirconia powder K, projections on the surface of the magnetic layer are increased, output is lowered and medium C/N is further lowered.

Comparative example 11 is similar to Comparative example 9 except that the thickness of the lower nonmagnetic layer was reduced from 1.7 to 0.8 μm. Projections on the surface of the magnetic layer are increased, output is lowered and medium C/N is further lowered as compared with Comparative example 9.

Comparative example 12 is similar to Comparative example 9 except that the magnetic material was replaced by low-σs magnetic material C. The replacement of the magnetic material results in a decrease of the Bm and Br (Bm×SQ) of the magnetic layer, output loss and a further decrease in medium C/N.

Comparative example 13 is similar to Comparative example 12 except that 5 parts by weight of zirconia powder H having a particle diameter of 0.02 μm was added. As compared with Comparative example 12, friction coefficient on Mag side is lowered, but the Bm of the magnetic layer is lowered and output is further lowered.

Example 20 is similar to Comparative example 9 except that α-alumina as an abrasive was not added but 5 parts by weight of zirconia powder H having a particle diameter of 0.02 μm was added instead. As compared with Comparative example 9, PSD around 5 μm was lowered and medium C/N was improved. Friction coefficient on Mag side was also lowered and edge damage during repeated running was improved.

Example 21 is similar to Example 20 except that the zirconia content was lowered from 5 to 2 parts by weight and 1.5 parts by weight of α-alumina having a particle diameter of 0.3 μm was added. As compared with Comparative example 9, medium C/N was higher and friction coefficient on Mag side was lower whereby damages during repeated running were improved.

Example 22 is similar to Example 21 except that the zirconia content was lowered from 2 to 1 parts by weight. Similarly to Example 21, medium C/N was higher and friction coefficient on Mag side was lower whereby damages during repeated running were improved as compared with Comparative example 9.

Example 23 is similar to Example 21 except that the magnetic material was replaced by low σs magnetic material A. As compared with Comparative example 9, the Bm of the magnetic layer and output was lowered, but medium C/N was still high and friction coefficient on Mag side was low whereby damages during repeated running were improved.

Example 24 is similar to Example 21 except that the thickness of the lower nonmagnetic layer was reduced from 1.7 μm to 0.8 μm. As compared with Comparative example 9 and Comparative example 11 having the same thickness structure, medium C/N was higher and friction coefficient on Mag side was lower.

Example 25 is similar to Example 21 except that the zirconia powder was replaced by finely granulated powder I and the thickness of the magnetic layer was reduced from 0.1 μm to 0.07 μm. As compared with Comparative example 9, both output and medium C/N were higher and friction coefficient on Mag side was lower whereby damages during repeated running were improved.

Example 26 is similar to Example 25 except that the thickness of the magnetic layer was increased from 0.07 μm to 0.25 μm. Surface properties such as Bm or 5 μm PSD of the magnetic layer were deteriorated and both output and medium C/N were lowered as compared with Example 25, but medium C/N was higher and friction coefficient on Mag side was lower whereby damages during repeated running were improved as compared with Comparative example 1.

Example 27 is similar to Example 25 except that the zirconia powder was replaced by J having a particle diameter of 0.1 μm. Similarly to Example 25, medium C/N was higher and friction coefficient on Mag side was lower whereby damages during repeated running were improved as compared with Comparative example 9.

Example 28 is similar to Example 26 except that the zirconia powder was replaced by J having a particle diameter of 0.1 μm. As compared with Comparative example 9, medium C/N was lowered to a comparable level, but friction coefficient on Mag side was low whereby damages during repeated running were improved.

ADVANTAGES OF THE INVENTION

According to the present invention, a magnetic recording medium capable of high-density recording with excellent running durability and preservability as well as a magnetic recording medium capable of high-density recording with excellent running durability and low noise even at high output can be provided.

What is claimed is:

1. A magnetic recording medium comprising:
    a magnetic layer containing a ferromagnetic powder; and
    a binder provided on a nonmagnetic flexible substrate,
    wherein said magnetic layer contains a zirconia powder having an average primary particle diameter of between 0.005–0.02 μm.

2. The magnetic recording medium according to claim 1 wherein said zirconia powder is at least one member selected from the group consisting of stabilized zirconia, partially stabilized zirconia and zirconia-reinforced ceramics.

3. The magnetic recording medium according to claim 1 wherein said zirconia powder is prepared by a liquid-phase (wet) process or a gas-phase process.

4. The magnetic recording medium according to claim 1 wherein said binder present in said magnetic layer contains a polar group.

5. The magnetic recording medium according to claim 1 wherein said magnetic layer contains a fatty acid.

6. A magnetic recording medium comprising:

a nonmagnetic layer containing a nonmagnetic powder and a binder; and a magnetic layer containing a ferromagnetic powder and a binder provided in this order on a nonmagnetic flexible substrate, wherein said magnetic layer contains a zirconia powder having an average primary particle diameter of between 0.005 0.02 μm.

7. The magnetic recording medium according to claim 6 wherein said zirconia powder is at least one member selected from the group consisting of stabilized zirconia, partially stabilized zirconia and zirconia-reinforced ceramics.

8. The magnetic recording medium according to claim 6 wherein said zirconia powder is prepared by a liquid-phase (wet) process or a gas-phase process.

9. The magnetic recording medium according to claim 6 wherein said binder present in said magnetic layer contains a polar group.

10. The magnetic recording medium according to claim 2 wherein said magnetic layer contains a fatty acid.

11. A magnetic recording medium comprising:

a nonmagnetic layer containing a nonmagnetic powder and a binder; and a magnetic layer containing a ferromagnetic powder and a binder provided in this order on a nonmagnetic flexible substrate, wherein said magnetic layer has an average thickness in the range of 0.04–0.3 μm, said ferromagnetic powder is a metal alloy powder having a σs of 130 A.m²/kg or more, and said magnetic layer contains a granulated powder having an average primary particle diameter of between 0.005–0.02 μm and a specific gravity of 5 or more.

12. The magnetic recording medium according to claim 11 wherein said granulated powder is a zirconia powder.

13. The magnetic recording medium according to claim 11 wherein said granulated powder present in said magnetic layer is in an amount of 0.5–10 parts by weight per 100 parts by weight of said metal alloy powder.

14. The magnetic recording medium according to claim 11 wherein said binder present in said magnetic layer is in an amount of 5–15 parts by weight per 100 parts by weight of said metal alloy powder.

15. The magnetic recording medium according to claim 11 wherein said magnetic layer has an SQ of 0.8 or more.

16. The magnetic recording medium according to claim 11 wherein said magnetic layer has an Hc in the range of 143,280–238,800 A/m (1800–3000 Oe).

* * * * *